(12) United States Patent
Jacques et al.

(10) Patent No.: US 12,481,198 B2
(45) Date of Patent: Nov. 25, 2025

(54) PROVIDING DRIVE SIGNALS FOR A DIFFERENTIAL DRIVE MODULATOR

(71) Applicant: Ciena Corporation, Hanover, MD (US)

(72) Inventors: Maxime Jacques, Montreal (CA); Gregory Brookes, Québec (CA); Michael Vitic, Chelsea (CA); Jean-Frédéric Gagné, Québec (CA)

(73) Assignee: Ciena Corporation, Hanover, MD (US)

( * ) Notice: Subject to any disclaimer, the term of this patent is extended or adjusted under 35 U.S.C. 154(b) by 288 days.

(21) Appl. No.: 18/323,018

(22) Filed: May 24, 2023

(65) Prior Publication Data

US 2023/0305356 A1   Sep. 28, 2023

Related U.S. Application Data

(63) Continuation-in-part of application No. 17/352,538, filed on Jun. 21, 2021, now Pat. No. 12,001,116.

(51) Int. Cl.
   *G02F 1/225*   (2006.01)
   *G02F 1/035*   (2006.01)
(52) U.S. Cl.
   CPC .......... *G02F 1/2257* (2013.01); *G02F 1/0356* (2013.01); *G02F 1/2255* (2013.01); *G02F 2201/127* (2013.01)
(58) Field of Classification Search
   CPC ................... G02F 1/2255; G02F 2201/127
   USPC ........................................................ 385/1–3
   See application file for complete search history.

(56) References Cited

U.S. PATENT DOCUMENTS

| | | |
|---|---|---|
| 6,192,167 B1 | 2/2001 | Kissa et al. |
| 6,522,793 B1 | 2/2003 | Szilagyi et al. |
| 6,567,203 B1 | 5/2003 | Hill et al. |
| 8,150,270 B2 | 4/2012 | Bonthron |
| 8,948,608 B1 | 2/2015 | Pobanz |
| 9,939,667 B1 | 4/2018 | El-Moznine et al. |

(Continued)

OTHER PUBLICATIONS

Benedikt Baeuerle et al., "120 GBd plasmonic Mach-Zehnder modulator with a novel differential electrode design operated at a peak-to-peak drive voltage of 178 mV," Opt. Express 27, 16823-16832 (2019].

(Continued)

*Primary Examiner* — Robert Tavlykaev
(74) *Attorney, Agent, or Firm* — Young Basile Hanlon & MacFarlane, P.C.

(57) ABSTRACT

A first (second) electrical input port receives a first (second) drive signal. A first (second) transmission line is configured to propagate a first (second) electromagnetic wave over at least a portion of a first (second) optical waveguide arm of an MZI to apply an optical phase modulation. A drive signal interconnection structure is configured to provide a first electrical connection between the first electrical input port and an inner electrode shared by the transmission lines, and a second electrical connection between the second electrical input port and respective outer electrodes of the transmission lines; and is configured to preserve relative phase shifts between the drive signals. An impedance associated with a first electric field distribution between the inner electrode and a first of the outer electrodes is substantially equal to an impedance associated with a second electric field distribution between the inner electrode and a second of the outer electrodes.

19 Claims, 38 Drawing Sheets

(56) References Cited

U.S. PATENT DOCUMENTS

| | | | |
|---|---|---|---|
| 10,423,014 B2 * | 9/2019 | Sugiyama | G02F 1/011 |
| 10,551,641 B1 | 2/2020 | Pobanz | |
| 10,564,450 B1 | 2/2020 | Bronzi | |
| 2003/0184459 A1 | 10/2003 | Engl | |
| 2003/0228081 A1 * | 12/2003 | Tavlykaev | G02F 1/0356 |
| | | | 385/3 |
| 2007/0024359 A1 | 2/2007 | Yamaji et al. | |
| 2009/0245813 A1 | 10/2009 | Bonthron | |
| 2014/0104666 A1 | 4/2014 | Minoia et al. | |
| 2015/0229408 A1 | 8/2015 | Ding et al. | |
| 2019/0094648 A1 | 3/2019 | Williams et al. | |
| 2020/0201135 A1 | 6/2020 | Davies et al. | |
| 2020/0393706 A1 | 12/2020 | Vera Villarroel et al. | |
| 2022/0197104 A1 | 6/2022 | Miyazaki et al. | |
| 2022/0404680 A1 | 12/2022 | Jacques et al. | |

OTHER PUBLICATIONS

Y. Baek et al., "94-GHz Log-Periodic Antenna on GaAs Substrate Using Air-Bridge Structure," in IEEE Antennas and Wireless Propagation Letters, vol. 8, pp. 909-911, 2009, doi: 10.1109/LAWP.2009. 2025523.

E. Anagnostou et al., "A 0-55-GHz Coplanar Waveguide to Coplanar Strip Transition," in IEEE transactions on microwave theory and techniques, vol. 56, No. 1, pp. 1-6, Jan. 2008, doi: 10.1109/TMTT. 2007.911909.

G. H. Lee, W. Mohyuddin, H. C. Choi and K. W. Kim, "Asymmetric Ultra-Wideband Microstrip-to-Coplanar Stripline Transition," in IEEE Microwave and Wireless Components Letters, vol. 28, No. 5, pp. 386-388, May 2018, doi: 10.1109/LMWC.2018.2822723.

A.A. Saadi, et al., "Low-loss broadband (DC to 220 GHz) S-CPW to S-CPS transition for S-CPS coplanar probing" Electronics Letters, vol. 55, No. 21, pp. 1137-1139, Oct. 17, 2019, DOI: 10.1049/el.2019.2377.

Young-Gon Kim, Kang Wook Kim, "Design of an Ultra-Wideband Transition from Double-Sided Parallel Stripline to Coplanar Waveguide", International Journal of Antennas and Propagation, vol. 2013, Article ID 921859, 9 pages, 2013. https://doi.org/10.1155/2013/921859.

\* cited by examiner

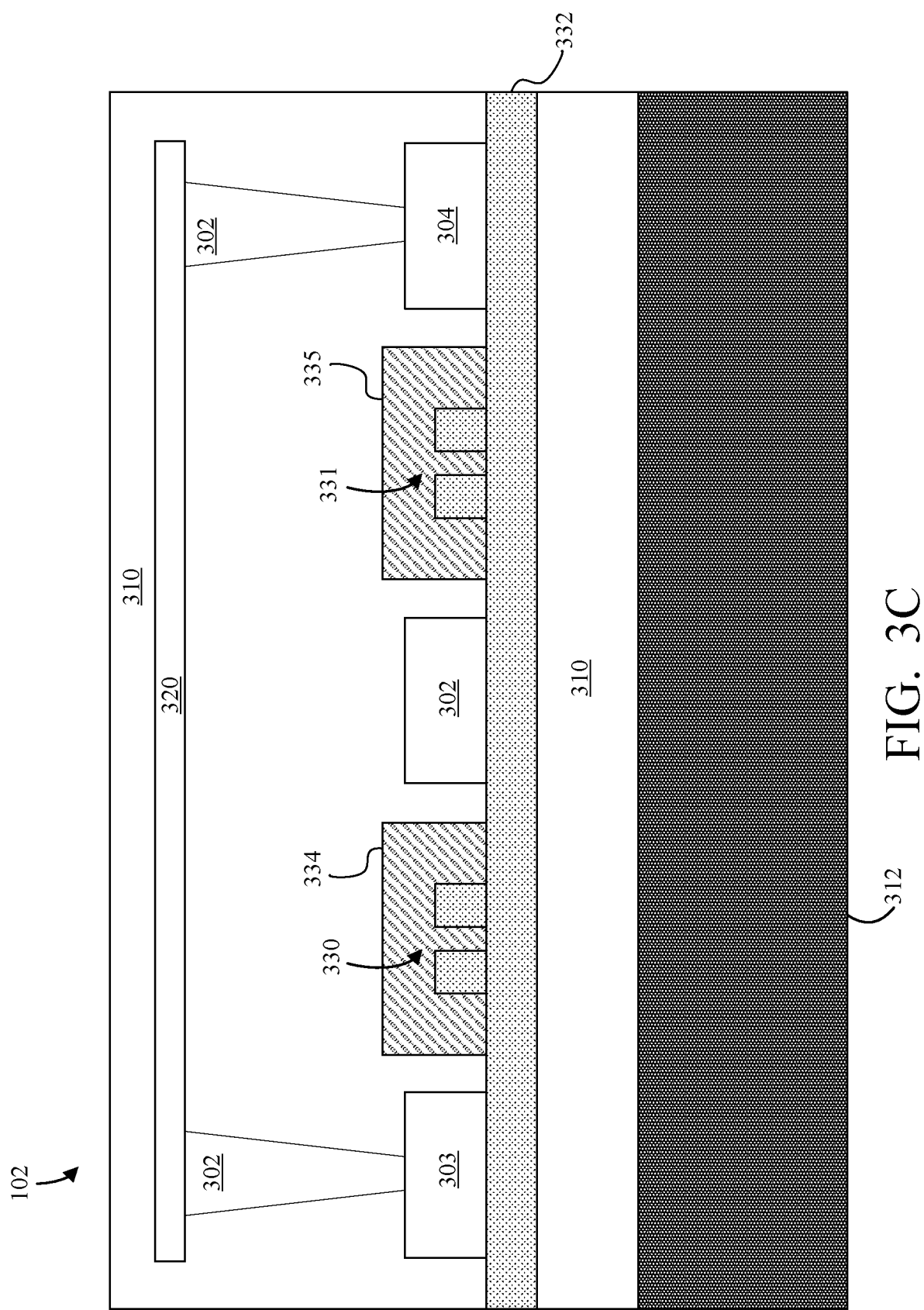

PROVIDING DRIVE SIGNALS FOR A DIFFERENTIAL DRIVE MODULATOR

CROSS-REFERENCE TO RELATED APPLICATION(S)

This application is a continuation-in-part of and claims priority to and the benefit of U.S. patent application Ser. No. 17/352,538, entitled "PROVIDING DRIVE SIGNALS FOR A DIFFERENTIAL DRIVE MODULATOR," filed Jun. 21, 2021, the entire disclosure of which is hereby incorporated by reference.

TECHNICAL FIELD

This disclosure relates to providing drive signals for a differential drive modulator.

BACKGROUND

A modulator is generally used to modulate a provided carrier wave with data to provide a modulated data signal. For example, an optical wave can be modulated using an optical modulator in an optical communication system. One type of optical modulator uses a Mach-Zehnder interferometer (MZI) to modulate the amplitude of an optical wave that is split at an input over two arms (e.g., waveguides) of the MZI and combined with respective phase shifts at an output, which is also known as a Mach-Zehnder modulator (MZM). Some MZMs are travelling-wave MZMs (TW-MZMs), which apply phase shifts over the arms using an electrical wave that propagates over a transmission line to apply the phase shifts. An example of a device that can use electrical fields (static or traveling-wave) to modulate a refractive index in, or in proximity to, the waveguide arms of an MZM is a device that includes an electro-optic (E-O) material (e.g., an E-O crystal) within the modulator structure. Such a modulator may be known as an E-O crystal MZM or E-O effect modulator. Various challenges may be encountered when attempting to operate such MZMs at relatively high frequencies (e.g., frequencies above 40 GHz), including challenges associated with drivers that provide drive signals (e.g., differential drive signals) for controlling the E-O phase shifts applied to the arm(s) of the MZM.

SUMMARY

In one aspect, in general, an apparatus comprises: an electro-optic material; an optical waveguide structure forming a Mach-Zehnder interferometer in proximity to the electro-optic material, where the Mach-Zehnder interferometer includes a first optical waveguide arm and a second optical waveguide arm; a first electrical input port configured to receive a first drive signal; a second electrical input port configured to receive a second drive signal that has a negative amplitude relative to the first drive signal; a first transmission line configured to propagate a first electromagnetic wave over at least a portion of the first optical waveguide arm to apply an optical phase modulation to an optical wave propagating in the first optical waveguide arm according to an electro-optic modulation of a portion of the electro-optic material; a second transmission line configured to propagate a second electromagnetic wave over at least a portion of the second optical waveguide arm to apply an optical phase modulation to an optical wave propagating in the second optical waveguide arm according to an electro-optic modulation of a portion of the electro-optic material; and a drive signal interconnection structure configured to provide a first electrical connection between the first electrical input port and an inner electrode shared by the first and second transmission lines, and a second electrical connection between the second electrical input port and respective outer electrodes of the first and second transmission lines, where the drive signal interconnection structure is configured to preserve relative phase shifts between the first and second drive signals; where a first impedance associated with a first electric field distribution between the inner electrode and a first of the outer electrodes and a second impedance associated with a second electric field distribution between the inner electrode and a second of the outer electrodes are substantially equal to each other.

In another aspect, in general, a method comprises: providing an electro-optic material; forming an optical waveguide structure forming a Mach-Zehnder interferometer in proximity to the electro-optic material, where the Mach-Zehnder interferometer includes a first optical waveguide arm and a second optical waveguide arm; forming a first electrical input port configured to receive a first drive signal; forming a second electrical input port configured to receive a second drive signal that has a negative amplitude relative to the first drive signal; forming a first transmission line configured to propagate a first electromagnetic wave over at least a portion of the first optical waveguide arm to apply an optical phase modulation to an optical wave propagating in the first optical waveguide arm according to an electro-optic modulation of a portion of the electro-optic material; forming a second transmission line configured to propagate a second electromagnetic wave over at least a portion of the second optical waveguide arm to apply an optical phase modulation to an optical wave propagating in the second optical waveguide arm according to an electro-optic modulation of a portion of the electro-optic material; and forming a drive signal interconnection structure configured to provide a first electrical connection between the first electrical input port and an inner electrode shared by the first and second transmission lines, and a second electrical connection between the second electrical input port and respective outer electrodes of the first and second transmission lines, where the drive signal interconnection structure is configured to preserve relative phase shifts between the first and second drive signals. A first impedance associated with a first electric field distribution between the inner electrode and a first of the outer electrodes and a second impedance associated with a second electric field distribution between the inner electrode and a second of the outer electrodes are substantially equal to each other.

Aspects can include one or more of the following features.

The drive signal interconnection structure is configured to transform electrical impedances associated with a changing electric field distribution of a guided mode propagating over the first electrical connection and changing electric field distribution of a guided mode propagating over the second electrical connection such that the first impedance and the second impedance are substantially equal to each other.

The drive signal interconnection structure comprises a first electrode between the first electrical input port and the electrode shared by the first and second transmission lines, a second electrode comprising an input arm coupled to the second electrical input port and a first output arm coupled to an electrode of the first transmission line, and a second output arm coupled to an electrode of the second transmission line.

The drive signal interconnection structure further comprises a third electrode that is electrically grounded and a fourth electrode that is electrically grounded, and all portions of the first electrode and all portions of the second electrode are between the third electrode and the fourth electrode.

The first electrode is configured to be positioned between the first output arm and the second output arm at a portion of the drive signal interconnection structure at which the first impedance and the second impedance are substantially equal to each other, without contacting any portion of the second electrode.

The first electrode is configured to cross above or below a portion of the second electrode at an angle that is substantially 90 degrees.

The optical waveguide structure is formed from a portion of the electro-optic material.

The first electric field distribution and the second electric field distribution are associated with a guided mode of an electromagnetic wave propagating over the first electrical connection and the second electrical connection, and the electromagnetic wave has a spectrum having a peak intensity between about 10 MHz and 100 GHz.

The electro-optic material, the optical waveguide structure, and the first and second transmission lines are on a first chip, and the drive signal interconnection structure is between the first chip and a second chip, where the second chip comprises a driver circuit configured to provide the first drive signal and second drive signal.

The second chip is mounted to the drive signal interconnection structure using a controlled collapse chip connection.

The drive signal interconnection structure comprises a riser structure mounted on a surface of a carrier, and the first and second chips are each mounted to the surface of the carrier.

The electro-optic material, the optical waveguide structure, and the first and second transmission lines are on a first chip, and the drive signal interconnection structure is located on a portion of a second chip, where the second chip comprises a driver circuit configured to provide the first drive signal and second drive signal.

The electro-optic material, the optical waveguide structure, and the first and second transmission lines are on a first chip, and the drive signal interconnection structure includes a portion that is located on an intersection between the first chip and a second chip, where the second chip comprises a driver circuit configured to provide the first drive signal and second drive signal.

Aspects can have one or more of the following advantages.

Some of the techniques for providing and/or applying drive signals to modulators (e.g., MZMs) are able to provide differential drive signals in a manner that is able to operate effectively at high frequencies (e.g., greater than 40 GHz, such as around 100 GHz or higher). For example, a "push-pull" differential signal includes two signals that are complementary to each other: a first signal S (also called the S complement, or simply S) and second signal $\overline{S}$ (also called the $\overline{S}$ complement, or simply $\overline{S}$), which has a negative amplitude relative to S, such that the relationship $S=-\overline{S}$ is at least approximately maintained during operation of the modulator. So, the sign of the amplitude of S is the opposite of the sign of the amplitude of $\overline{S}$, and the magnitude (i.e., absolute value) of the amplitude of S is substantially equal to the magnitude of the amplitude of $\overline{S}$. Given the symmetry between the complementary signals, the designation of which one is labeled as S, and which one is labeled as $\overline{S}$, can be interchanged in any of the examples described and illustrated herein. These differential drive signals generally enable better signal integrity and reduced power consumption compared to modulators that are controlled by a single-ended driver, especially for high-frequency operation.

Some of the approaches described herein show techniques for implementing a 3-port driver that is configured for driving a differential drive modulator, and some of the approaches described herein show techniques for interconnecting a differential driver (e.g., a 2-port driver, or a 3-port driver) to an MZM in ways that preserve signal integrity (e.g., amplitudes and relative phases). The approaches apply to transmission line implementations that use a $\overline{S}$-S-$\overline{S}$ electrode configuration with two $\overline{S}$ electrodes on both sides of a center S electrode, or a G-$\overline{S}$-S-$\overline{S}$-G electrode configuration that additionally include ground electrodes on both sides, as described in more detail below. Also described herein is an example of a passive termination circuit that can be used at the end of the transmission line electrodes to properly bias the driver output signals for a driver with an open-collector (OC) architecture, or any of a variety of other driver architectures that may be biased in a similar manner (e.g., open drain, emitter follower, or source follower).

Other potential benefits of differential (also called "balanced") drive signals over single-ended drive signals include lower even-order harmonic generation at the driver output, and a more confined electric field, which reduces potential crosstalk, especially in circumstances where the driver and modulator are integrated on the same die. Enhancements to signal integrity of the drive signals delivered to a TW-MZM include increased signal-to-noise ratio (SNR) and therefore increased achievable propagation distance and/or modulation format complexity (and higher throughput). For example, a larger dynamic swing in the drive signals increases SNR through an increased optical modulation amplitude (OMA). There is also a higher average optical power transmitted in the MZM.

For the same total voltage swing there is a lower total TW-MZM dynamic power consumption, for example, in some cases by up to a factor of two. Also, since the required peak-to-peak voltage $V_{pp}$ is split between a signal pair, each drive signal (S and $\overline{S}$) requires half the amplitude as compared to a single-ended drive signal. The voltage needed to achieve a relative phase shift of 180 degrees in the MZM ($V_\pi$~0.6-1.5 V) potentially enables the direct use of CMOS inverters (with a lower swing) to drive the MZM, without necessarily requiring the use of an external driver. This advantages potentially provide significant savings of cost, module footprint, and/or energy.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A, 3B, and 3C are schematic diagrams of example optoelectronic circuit configurations.

DETAILED DESCRIPTION

Figure 1A:
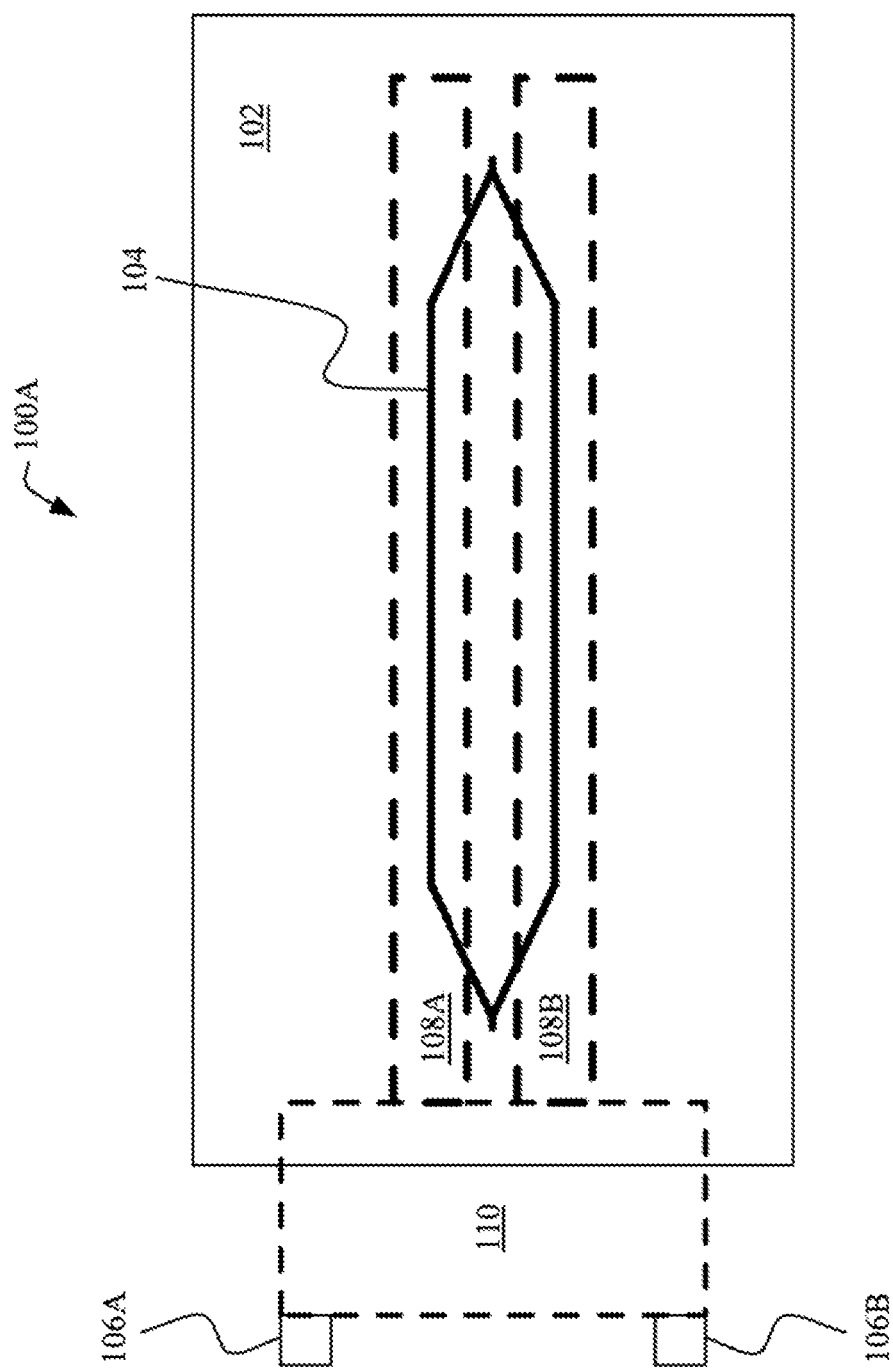
FIGS. 1A and 1D are schematic diagrams of an example modulator driven by 2-port and 3-port drivers, respectively.

Differential-output drivers can be advantageous over single-end output drivers because they allow features such as: (1) cancellation or strong suppression of common-mode noise and other common impairments (like even-order harmonics) that may be present at a DAC/driver channel output, 2) an increase in the available swing at the modulator, and/or 3) for a fixed swing and fixed modulator/termination resistance, up to half the dynamic power consumption at the TW-MZM termination. The latter can be achieved because, for a prescribed optical phase shift at the TW-MZM, differential-driving allows half the swing of each drive signal compared to single-ended driving. This allows for a theoretical reduction by up to a factor of two in dynamic driver power consumption at the radio frequency (rf) termination of the TW-MZM compared to the single-ended case $$P_{SE} \approx \frac{V_{rms}^2}{Z_0},$$

since $$2x \frac{(V_{rms}/2)^2}{Z_0} = \frac{1}{2} \frac{V_{rms}^2}{Z_0},$$

where $Z_0$ is the characteristic impedance. Furthermore, differential-output drivers can also reduce the static power consumption by reducing the supply voltage since the swing is shared between two complements of a differential pair.

A differential driver reduces the supply voltage by half the swing, while still maintaining the same headroom as single-ended driver. Additionally, differential driving also allows for unterminated topologies such as Emitter Follower Push Pull (EFPP) and Open-Collector (OC), whereas single-ended driving are in some cases restricted to a traveling-wave amplifier (TWA) or a terminated single-ended driver.

In the context of TW-MZMs, drivers with differential channel outputs can be used in some cases to drive transmission lines that use coplanar strip (CPS) or dual coplanar waveguide (CPW) RF electrode configurations such as the following:

a) $\overline{S}$-S (CPS, 'series push-pull' MZM architecture for SiPhot),
  b) G-$\overline{S}$-S-G (dual-CPS), or
  c) G-$\overline{S}$-G-S-G (dual-CPW, fully shielded).

These transmission line electrode configurations can be fabricated using integrated modulator technologies such as InP and SiPhot, which respectively rely on the quantum-confined Stark effect (QCSE) and plasma dispersion (free-carrier refraction). However, for linear-phase electro-optic (E-O) crystals such as bulk LiNbO$_3$ (LN), or integrated platforms such as a thin-film of LiNbO$_3$ (TFLN, ~X-cut) or Silicon-Organic Hybrid (SOH) on a substrate (e.g., on SiO$_2$), due to the relatively low linear capacitance (i.e., absence of pn junction loading in the optical waveguides) and the field-effect nature of the modulators, electrode configurations of the type G-S-G (for single-ended driving), and $\overline{S}$-S-$\overline{S}$ or G-$\overline{S}$-G-$\overline{S}$-G (for differential driving) provide advantages.

Some of the described approaches are directed to achieving optimal interconnection between a differential driver and a modulator that has a radio frequency (rf) transmission line electrode configuration of the type $\overline{S}$-S-$\overline{S}$ or G-$\overline{S}$-G-$\overline{S}$-G (e.g., as shown in FIGS. 1A-1D). In some of the examples described herein, the $\overline{S}$-S-$\overline{S}$ electrode configuration is used to show implementations of a differential drive electrode configuration for an E-O crystal TW-MZM, but the techniques described herein can also be applied to G-$\overline{S}$-G-$\overline{S}$-G electrode configuration, and other integrated modulator technologies that may benefit from $\overline{S}$-S-$\overline{S}$ or G-$\overline{S}$-G-$\overline{S}$-G differential electrode configurations, such as SOH modulators. In some implementations, the $\overline{S}$ signal from a 2-port driver is split on-chip in interconnection circuitry that is fabricated on, or bonded to, the same die as the MZM. In other implementations, a 3-port driver provides an S signal and two $\overline{S}$ signals at respective driver output ports, and the $\overline{S}$ signal is split within the driver (e.g., as shown in FIG. 2A), and in some implementations, at the transistor level (e.g., as shown in FIG. 2B). In some implementations, a passive termination circuit can be used to properly bias the driver output signals for an open-collector (OC) architecture. In either the 2-port or 3-port driver implementations, the connections between the driver and the modulator can be formed using any of a variety of techniques, including wire-bonds, or a controlled collapse chip connection, also called flip-chip or C4 connection. Also, the output ports of the driver may serve as input ports of the TW-MZM, including any wire-bonds or other structures extending to various portions of the TW-MZM.

Figure 1B:
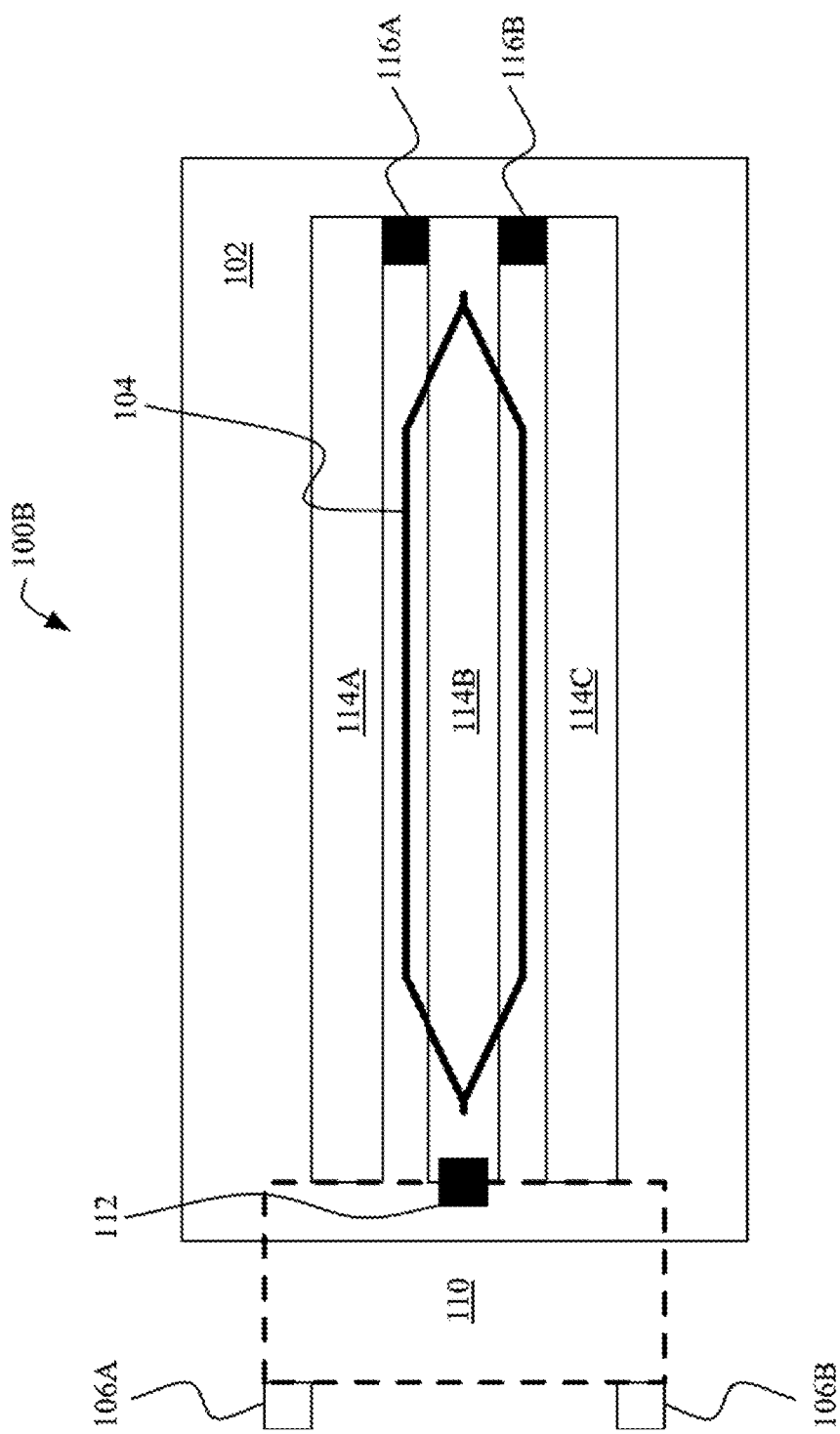
FIGS. 1B and 1C are schematic diagrams of example implementations of the modulator of FIG. 1A.
Figure 1C:
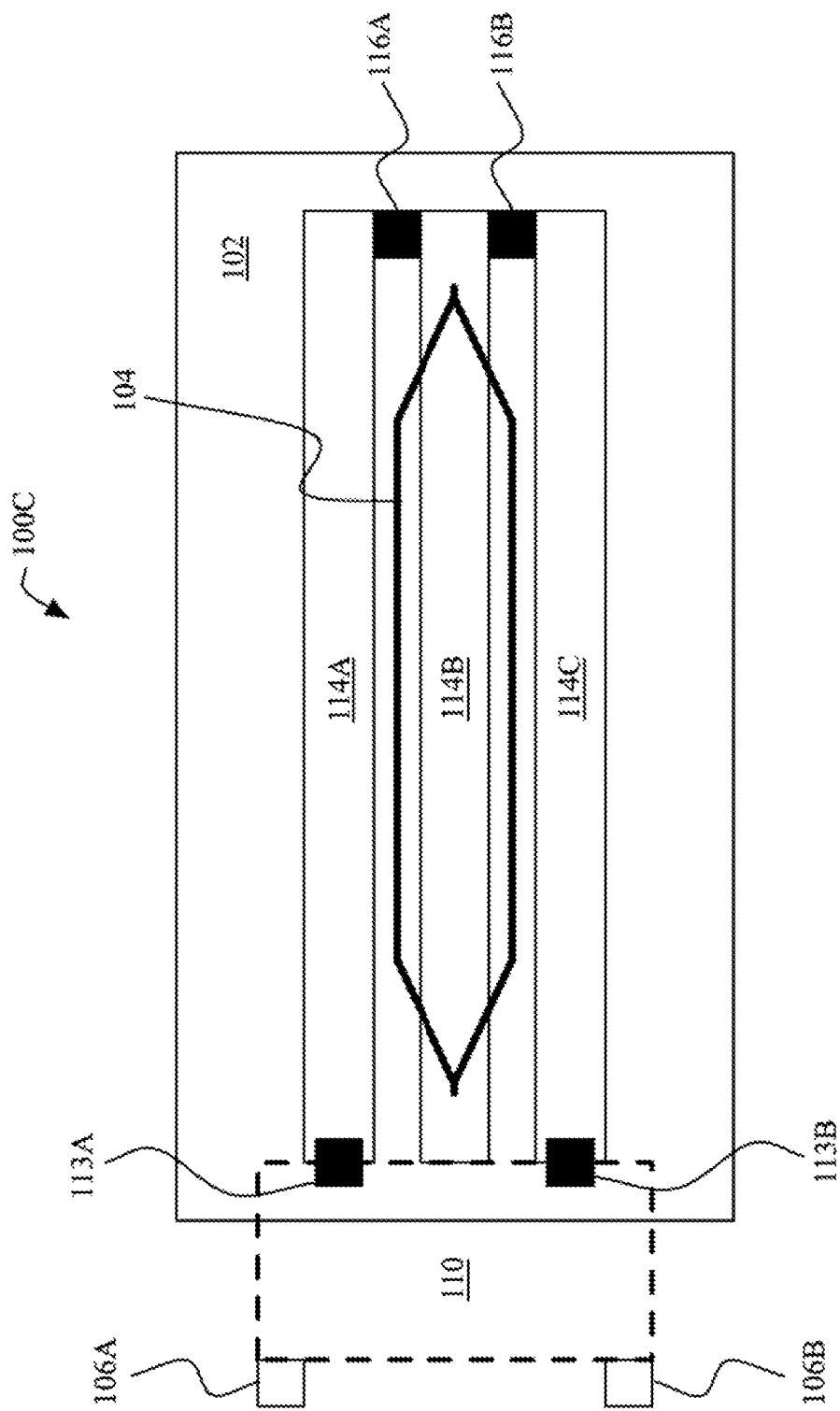
Figure 2A:
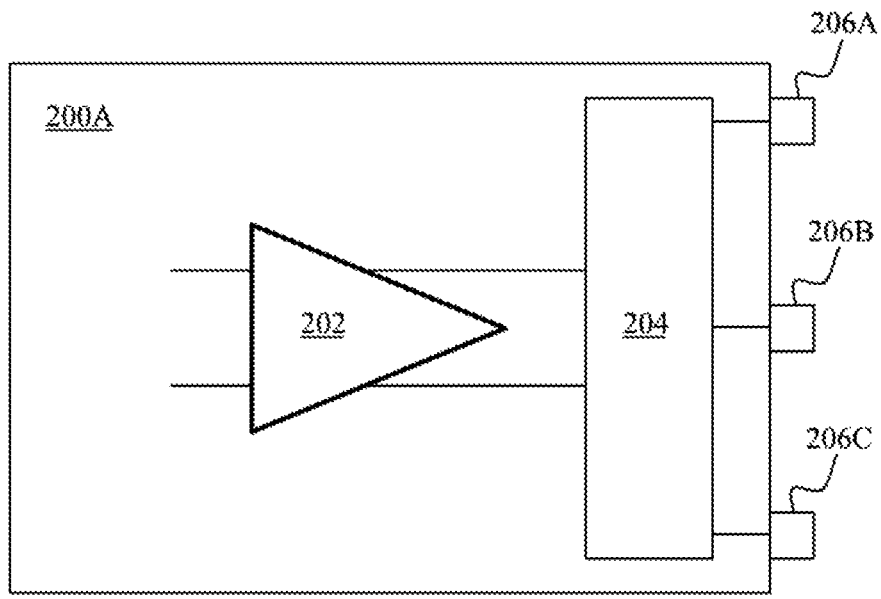
FIGS. 2A and 2B are schematic diagrams of example 3-port drivers.
Figure 2B:
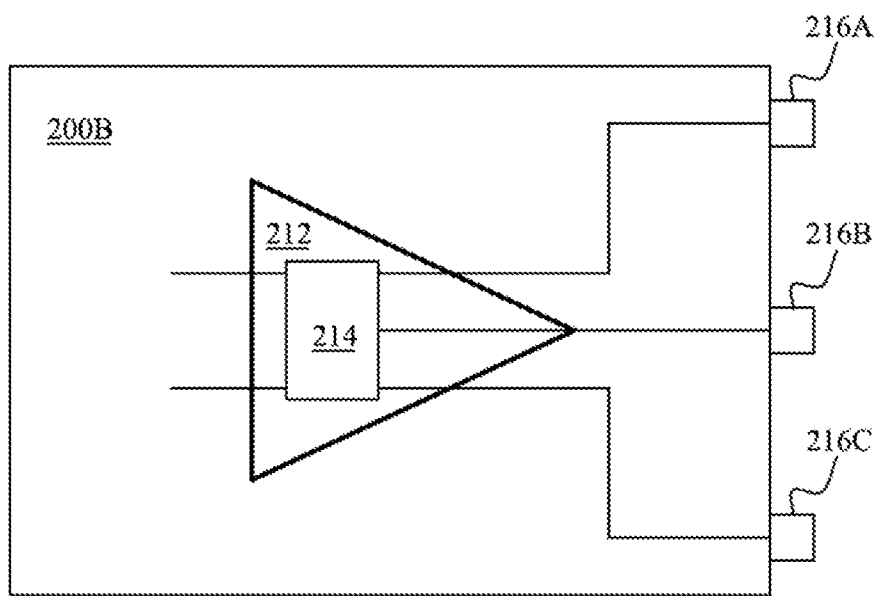

Referring to FIG. 1A, a modulator 100A includes an electro-optic material 102. For example, the electro-optic material 102 can be an electro-optic crystal, or any material (e.g., polymers and/or SOH) that produces an optical index change in response to an electric field (e.g., when being electrically poled). An optical waveguide structure 104 forms a Mach-Zehnder interferometer in proximity to the electro-optic material 102 (e.g., with waveguide cores formed in ridges etched into the electro-optic material 102, or deposited or grown on the electro-optic material 102, or a slot optical waveguide with electro-optic material formed between higher index ridges, such as Si ridges, as shown in FIG. 3C). The Mach-Zehnder interferometer includes two optical waveguide arms as part of the optical waveguide structure 104. A first electrical input port 106A is configured to receive a first drive signal, and a second electrical input port 106B is configured to receive a second drive signal that has a negative amplitude relative to the first drive signal. A first transmission line 108A is configured to propagate a first electromagnetic wave over at least a portion of a first optical waveguide arm to apply an optical phase modulation to an optical wave propagating in the first optical waveguide arm according to an electro-optic modulation of a portion of the electro-optic material 102. A second transmission line 108B is configured to propagate a second electromagnetic wave over at least a portion of a second optical waveguide arm to apply an optical phase modulation to an optical wave propagating in the second optical waveguide arm according to an electro-optic modulation of a portion of the electro-optic material 102. A drive signal interconnection structure 110 is configured to provide a first electrical connection between the first electrical input 106A port and an electrode (not shown) shared by the first and second transmission lines 108A and 108B (e.g., as shown in FIGS. 1B and 1C), and a second electrical connection between the second electrical input port 106B and different respective electrodes of the first and second transmission lines 108A and 108B (i.e., different from the shared electrode). In some implementations, the drive signal interconnection structure 110 is configured to preserve relative phase shifts between the first and second drive signals. Generally, the drive signal interconnection structure 110 provides interconnection between a driver (i.e., any source of drive signals) and a MZM structure. In some implementations, the interconnection structure 110 is formed using electrodes located on the same optoelectronic chip that contains the MZM structure (e.g., as in the examples shown in FIGS. 4A-4B), and in other implementations, the interconnection structure 110 is formed using electrodes located on an insulating substrate that is between the driver and the optoelectronic chip that contains the MZM structure (e.g., as in the examples shown in FIGS. 9A-9B, 10A-10B, and 11A-11B). Such an intermediate insulating substrate can provide certain advantages, as described in more detail below.

In some implementations, an input impedance at the first electrical input port 106A and an input impedance at the second electrical input port 106B are substantially equal to each other. For example, referring to FIG. 1B, a modulator 100B includes electrodes 114A, 114B, and 114C on the surface of the electro-optic material 102. One transmission line is formed between the center electrode 114B and one of the outer electrodes 114A, and another transmission line is formed between the center electrode 114B and the other outer electrode 114C. In this example, an impedance transforming structure 112 is configured to transform an electrical impedance associated with an electrical connection to the shared center electrode 114B such that an input impedance at the first electrical input port 106A and an input impedance at the second electrical input port 106B are substantially equal to each other, as will be described below in more detail.

Figure 1D:
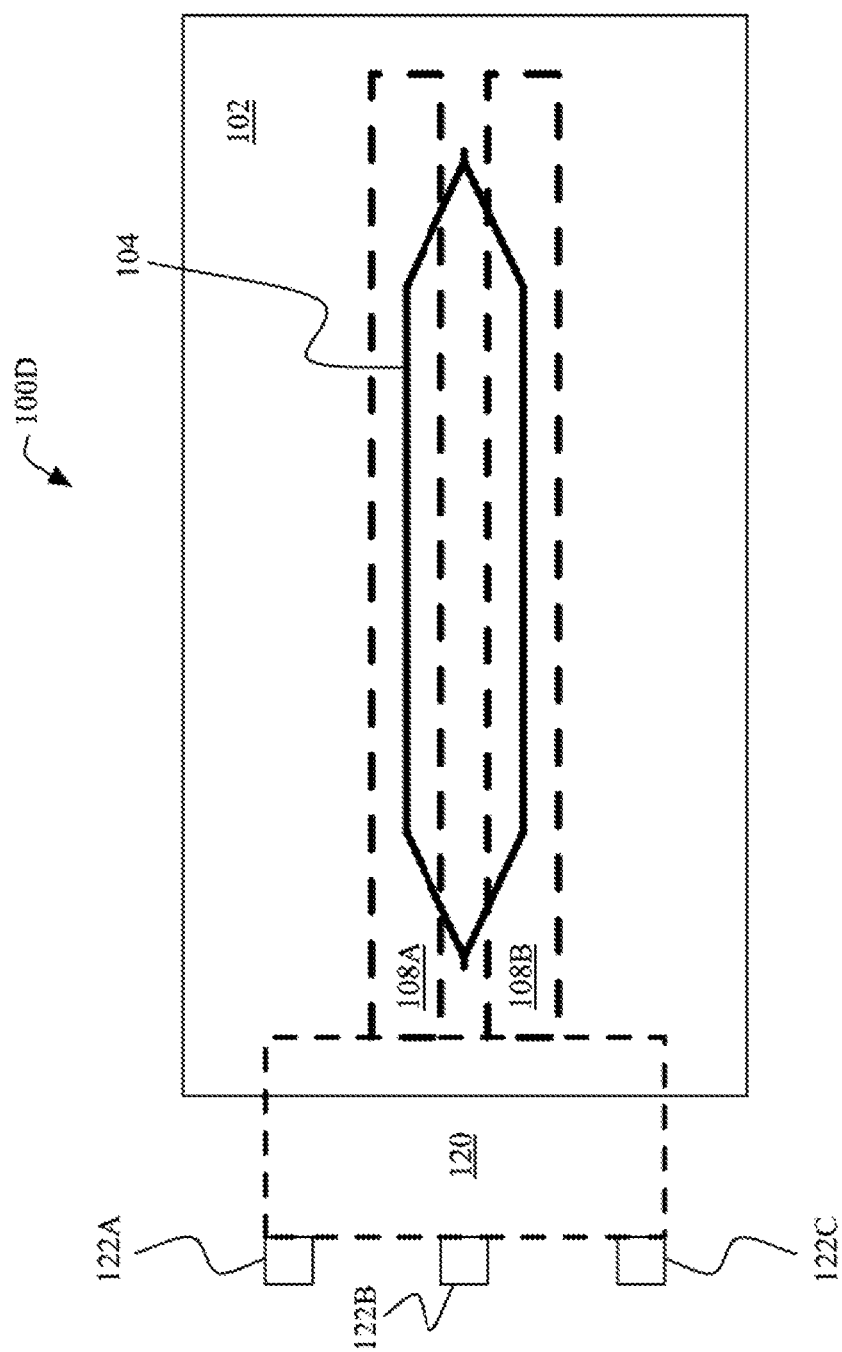

In this example of FIG. 1B, the transmission lines are also terminated with respective structures 116A and 116B that each has an impedance that is substantially equal to a characteristic impedance of the first transmission lines, which substantially avoids any reflections back into the transmission lines. Alternatively, referring to FIG. 1C, a modulator 100C includes multiple impedance transforming structures 113A and 113B to transform the electrical impedances to match the input impedances at the input ports 106A and 106B. Referring to FIG. 1D, a modulator 100D includes a drive signal interconnection structure 120 that is configured to include three separate input ports 122A, 122B, and 122C for connection to output ports of a 3-port driver that is configured to provide multiple versions of a complement signal that has a negative phase of a primary signal, as described in more detail below.

The design of the electrodes that are part of some implementations of the interconnection structure 110 can also be configured as an impedance transforming structure that provides impedance matching. Along the length of the electrodes, smooth changes (e.g., slowly varying) to the electromagnetic field profile may be implemented in order to limit the excitation of unwanted modes. For example, an RF interconnect that converts S-$\overline{S}$ electrodes to $\overline{S}$-S-$\overline{S}$ electrodes may be designed to have a short extent and a similar electromagnetic field distribution so as to reduce unwanted excitations of RF waves in nearby waveguides. Additionally, the electromagnetic field transition may be made to be gradual enough to allow for gradual manipulations of the electromagnetic field distribution into a desired mode. In addition to the electric fields between the $\overline{S}$-S-$\overline{S}$ electrodes, the ground electrodes may also be considered when designing for impedance matching, since some of the electromagnetic energy may be conducted through them as well. Features of such designs are described in more detail with reference to the intermediate interconnection structure examples described below.

Referring to FIG. 2A, one example of a 3-port driver 200A includes a differential-output driver circuit 202 that provides an S signal and an $\overline{S}$ signal, and splitting circuitry 204 passes the S signal to an output port 206B, and provides two $\overline{S}$ signals at respective output ports 206A and 206C. Referring to FIG. 2B, another example of a 3-port driver 200B includes a differential-output driver circuit 212 that includes internal transistor-level circuitry 214 that provides an S signal and two $\overline{S}$ signals, with the S signal provided to an output port 216B, and two S signals provided to respective output ports 216A and 216C. In some implementations of both the drivers 200A and 200B, the two $\overline{S}$ signals each have a voltage magnitude approximately equal to the voltage magnitude of the S signal and a negative voltage amplitude compared to the S signal (i.e., opposite sign), and a current approximately half of the current of the S signal. Generally, the $\overline{S}$ signals each carry half the power of the S signal and each have opposite polarity with respect to the S signal. Optionally, in some implementations there may be one or more output ports (not shown) that are grounded (i.e., at zero voltage).

Figure 3A:
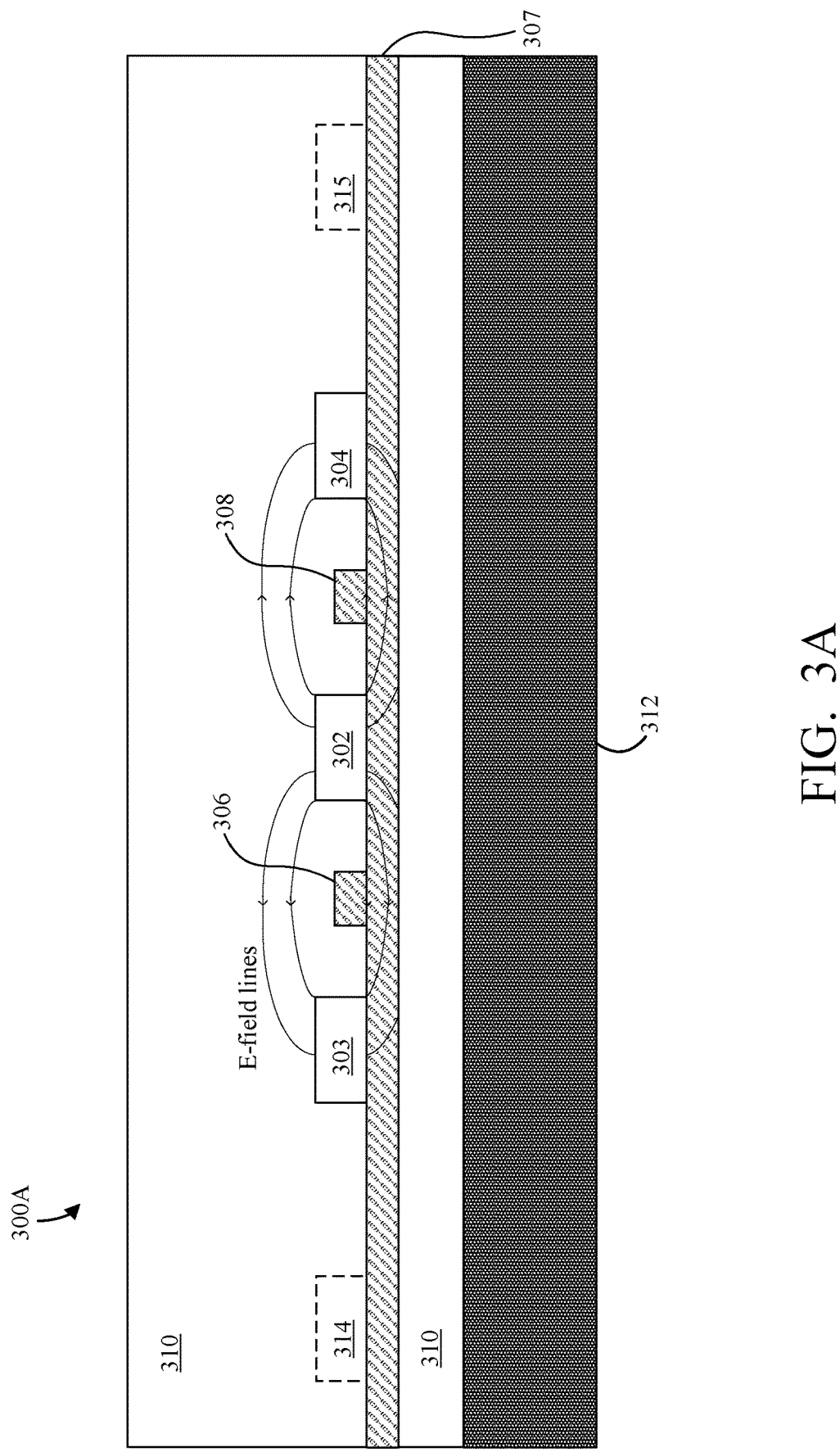

Referring to FIG. 3A, a side view of an optoelectronic circuit 300A (e.g., a photonic integrated circuit, using a silicon-on-insulator or other semiconductor based fabrication process) shows portions of a TW-MZM including a center electrode 302 and two outer electrodes 303 and 304, shown here with propagation axis normal to the page such that electric field lines between electrodes for a rf electrical waves propagating down the transmission lines are shown within the plane of the page. A first waveguide arm 306 formed as a rib optical waveguide from an electro-optic material 307 (e.g., a thin film of Lithium Niobate) has its index of refraction modulated by an electric field between electrodes 302 and 303, and a second waveguide arm 308 formed as a rib optical waveguide from the electro-optic material 307 has its index of refraction modulated by an electric field between electrodes 302 and 304. The electro-optic material 307 can be deposited over a layer of silicon dioxide 310 that is over a substrate 312, and additional silicon dioxide 310 can be deposited over these structures. Optionally, in some implementations, there are additional electrodes 314 and 315 on the outside of the TW-MZM structure that are grounded (i.e., at zero voltage).

Figure 3B:
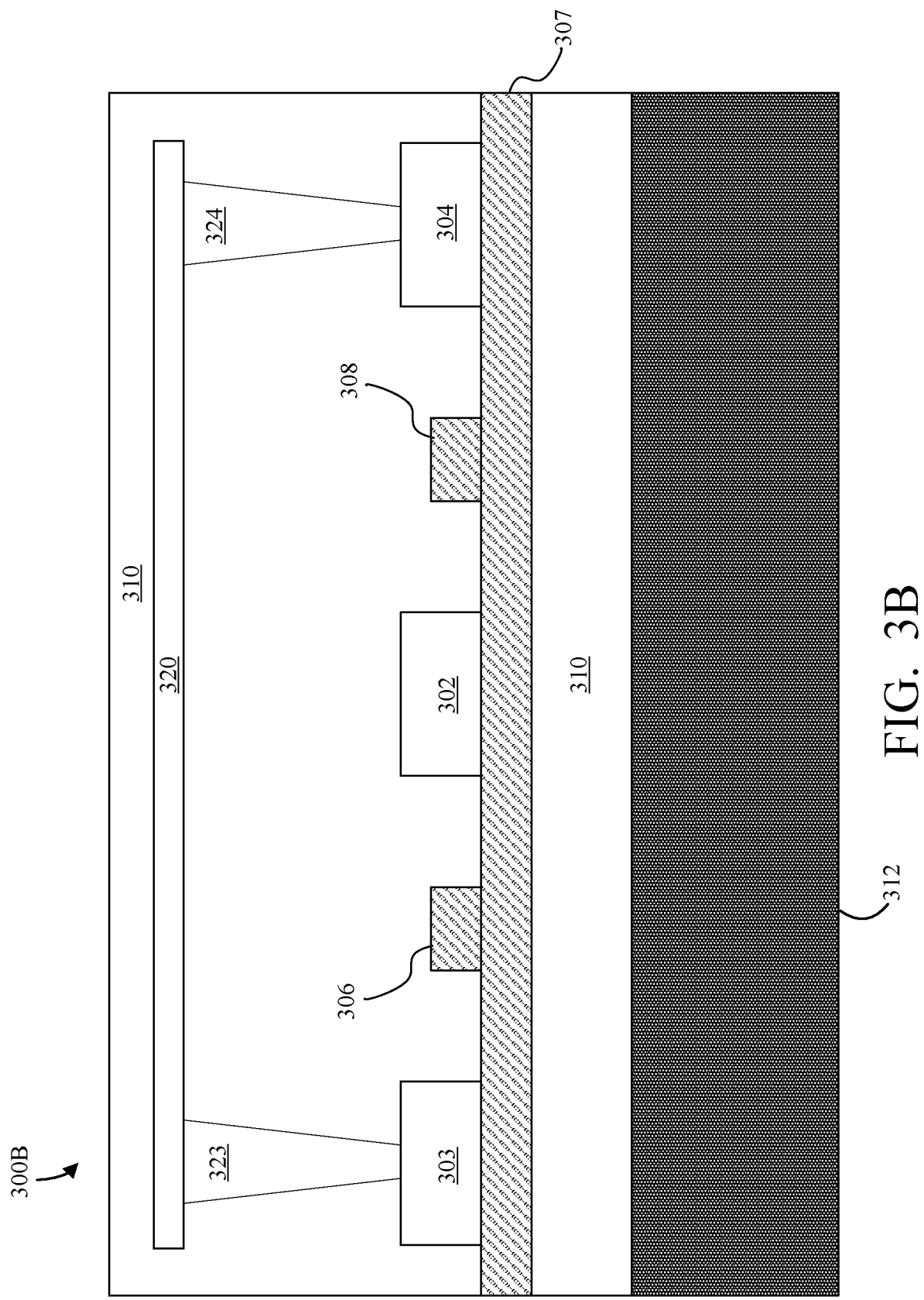

Referring to FIG. 3B, another example of an optoelectronic circuit 300B additionally includes a second metal layer 320 that is used provide a connection between the outer electrodes 303 and 304 using metal vias 323 and 324, respectively, connected through the metal layer 320, as described in more detail below. Referring to FIG. 3C, another example of an optoelectronic circuit 300C uses slot optical waveguides 330 and 331 formed from a semiconductor material 332 (e.g., silicon), with an electro-optic material 334 filling and surrounding the slot optical waveguide 330, and an electro-optic material 335 in filling and surrounding the slot optical waveguide 331. The optoelectronic circuit 300C can be fabricated using a silicon-organic hybrid (SOH) fabrication technique, for example.

Figure 4A:
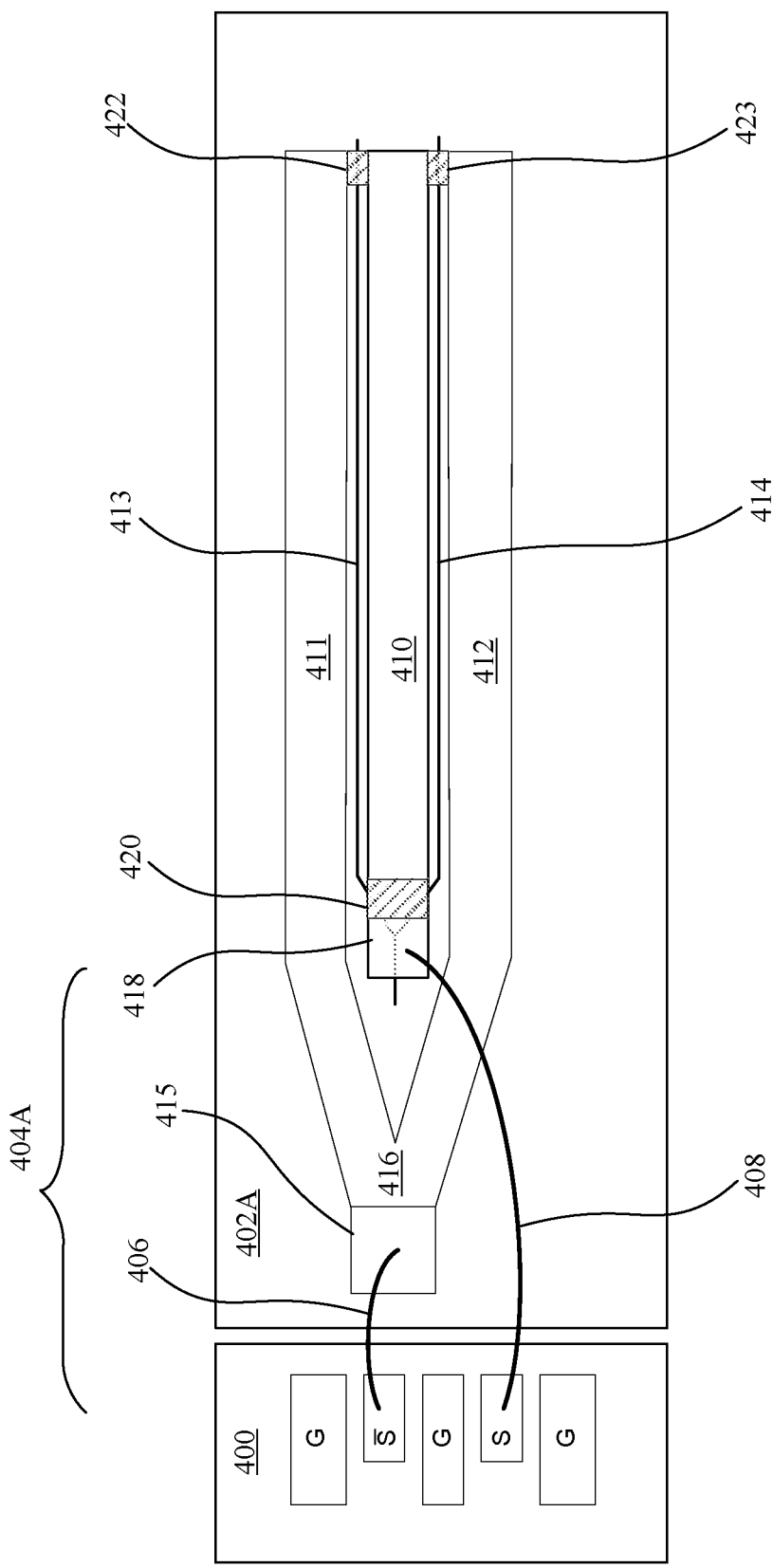
FIGS. 4A and 4B are schematic diagrams of example driver and modulator devices.
Figure 4B:
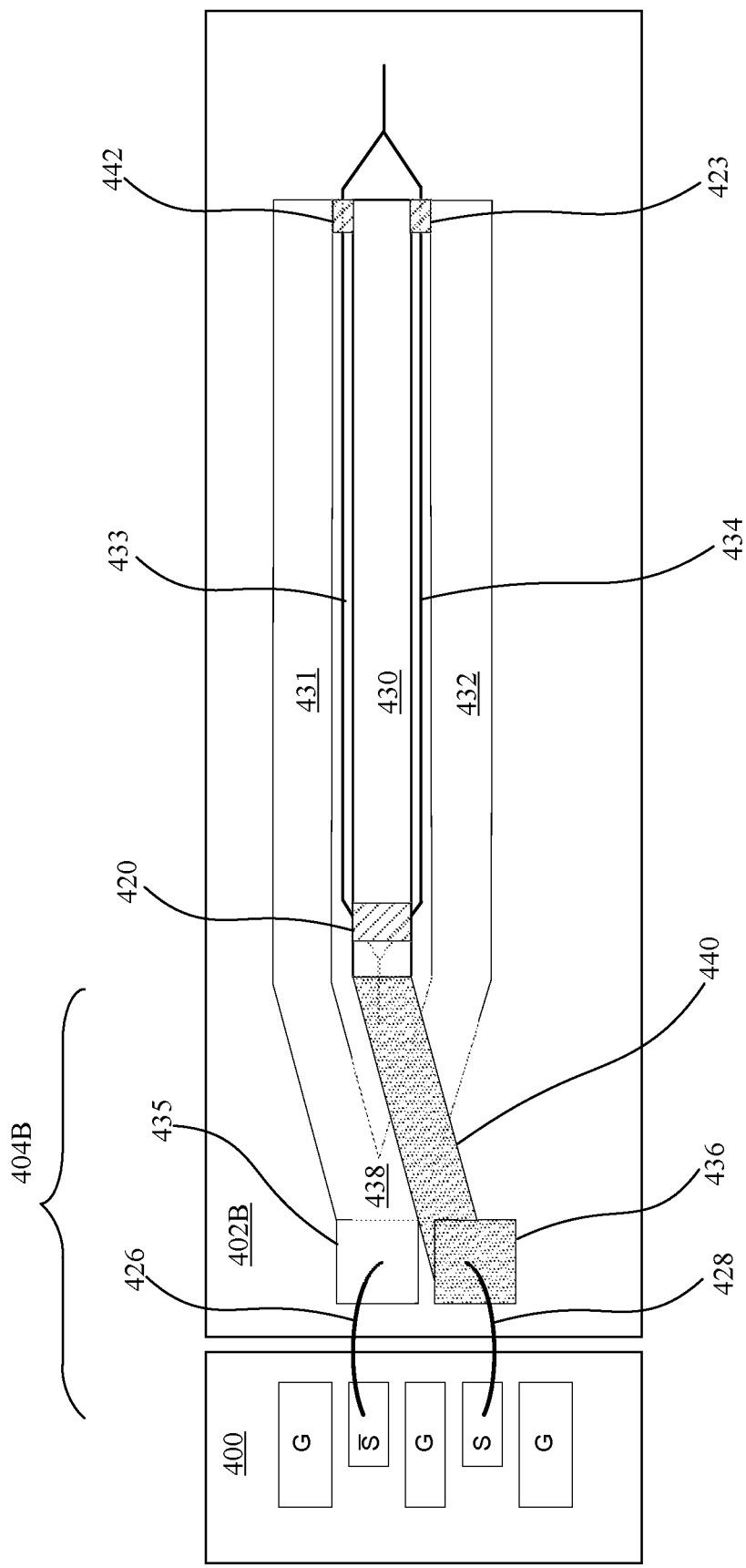

Some approaches for interconnecting a 2-port driver to a modulator are based on a symmetric delay-matching (also called skew-matching) technique for preserving the phases of the two S signals. FIGS. 4A and 4B show implementations for interconnecting driver signals from two output ports of a driver chip to input ports of an optoelectronic chip containing a TW-MZM. In these implementations, integrated metal traces split the $\overline{S}$ signal on the optoelectronic chip before they connect to electrodes that form transmission lines of the TW-MZM. Both implementations use a $\overline{S}$-S-$\overline{S}$ electrode configuration. Also, in both implementations, the rf path lengths for the two $\overline{S}$ signals and the S signal are all substantially equal, from the output ports of the driver to the terminations of the transmission lines of the TW-MZM. Optionally, an impedance transforming structure (also called an "impedance buffer" or "Z buffer") can be used to transform an electrical impedance associated with at least one of two electrical connections from the 2-port driver such that input impedances at the two electrical input ports of the optoelectronic chip, as seen by the output ports of the driver chip, are substantially equal to each other.

Referring to FIG. 4A, a driver chip 400 is connected to an optoelectronic chip 402A by a drive signal interconnection structure 404A that is formed by wire-bonds 406 and 408 and metal structures within a single metal layer of the optoelectronic chip 402A. A TW-MZM is formed on the optoelectronic chip 402A by structures that include a center electrode 410, outer electrodes 411 and 412, and a Mach-Zehnder interferometer with waveguide arms 413 and 414. The wire-bond 406 is formed between an $\overline{S}$ contact pad of the driver chip 400 and an outer electrode contact pad 415 in a metal layer of the optoelectronic chip 402A. A v-shaped metal trace connection 416 in the same metal layer connects to each of the outer electrodes 411 and 412. The wire-bond 408, which is longer than the wire-bond 406, is formed between an S contact pad of the driver chip 400 and a center electrode contact pad 418. The lengths of the wire-bonds 406 and 408 are selected so that the propagation delay across a wide bandwidth for rf signals between the driver and the beginning of the transmission lines of the TW-MZM are substantially equal. This propagation delay matching preserves relative phase shifts between the S and S signals. In some implementations, wedge-bonds can be installed to achieve relatively precise relative timing for matching the propagation delay. The driver chip 400 can also optionally include ground contacts (G) as shown in this example.

Between the contact pad 418 and the center electrode 410 is an impedance buffer 420, which compensates for an impedance difference between the impedance for the parallel combination of split $\overline{S}$ signals and the impedance of the single S signal at the input ports of the optoelectronic chip 402A, where the input ports are defined at the beginning of the wire-bonds 406 and 408, respectively. Alternatively, in other examples, there can be impedance buffers between the ends of the v-shaped metal trace connection 416 and the outer electrodes 411 and 412, instead of, or in addition to the location shown in this example. The change in impedance that is provided by the impedance buffer 420 can be configured based on various structural factors, including the exact coplanar waveguide geometry of the transmission lines, such as the width and/or spacing of the three metal traces that form the electrodes of the transmission lines. The impedance buffer 420 can be formed from one or more layers of resistive material, and/or conductive material, and can include circuit components such as resonant stubs or transformers. The components, materials and/or structural geometries can be configured to provide inductance and/or capacitance that may be needed to compensate for any impedance mismatch over a broad rf signal bandwidth. An impedance buffer 420 may not be needed in some implementations if the input impedances are matched based on the geometries of the electrodes 410, 411, and 412. For example, if the outer electrodes 411 and 412 are each half the width of the center electrode 410 so that their resistance is about twice as high, then their equivalent combined parallel impedance at the input port for the $\overline{S}$ signal may be substantially equal to the impedance at the input port for the S signal. Or, more generally, the outer electrodes 411 and 412 may have an equivalent parallel characteristic impedance $Z_0$ that is substantially equal to the characteristic impedance $Z_0$ of the center electrode 410.

At the end of each transmission line is a termination structure that has an impedance that is substantially equal to a characteristic impedance of that transmission line. In this example, the termination structures 422 and 423 have impedances that are substantially matched over the rf spectrum of drive signals that will be provided by the driver chip 400. For example, the material of the termination structures 422 and 423 can be a resistive material in the same layer as the metal of the electrodes 410, 411, and 412.

Referring to FIG. 4B, the driver chip 400 is connected to an optoelectronic chip 402B by a drive signal interconnection structure 404B that is formed by wire-bonds 426 and 428 and metal structures within two metal layers of the optoelectronic chip 402B. A TW-MZM is formed on the optoelectronic chip 402B by structures that include a center electrode 430, outer electrodes 431 and 432, and a Mach-Zehnder interferometer with waveguide arms 433 and 434. The wire-bond 426 is formed between an $\overline{S}$ contact pad of the driver chip 400 and an outer electrode contact pad 435 in a top metal layer of the optoelectronic chip 402B. The wire-bond 428 is formed between an S contact pad of the driver chip 400 and a center electrode contact pad 436 in the top metal layer of the optoelectronic chip 402B. A v-shaped metal trace connection 438 in the top metal layer connects to each of the outer electrodes 431 and 432. The center electrode contact pad 436 is electrically connected to the center electrode 430 by a metal trace 440 that is in a lower metal layer underneath the top metal layer, with appropriate vertical metal contacts or vias between the two metal layers at the ends of the metal trace 440. In this implementation, delays due to the v-shaped metal trace connection 438 and the delay due to the metal trace 440 are substantially equal since their lengths are substantially equal. So, the lengths and shapes of the wire-bonds 426 and 428 can be substantially identical to each other since they do not need to compensate for different delays downstream.

At the end of each transmission line is a termination structure that has an impedance that is substantially equal to a characteristic impedance of that transmission line. In this example, the termination structures 442 and 443 have impedances that are substantially matched over the rf spectrum of drive signals that will be provided by the driver chip 400.

Generally, in the interconnection structures 404A and 404B are compact and configured to reduce impairments. For example, the parasitic inductances associated with the metal traces are relatively small since the lengths of the metal traces are relatively short.

Figure 5A:
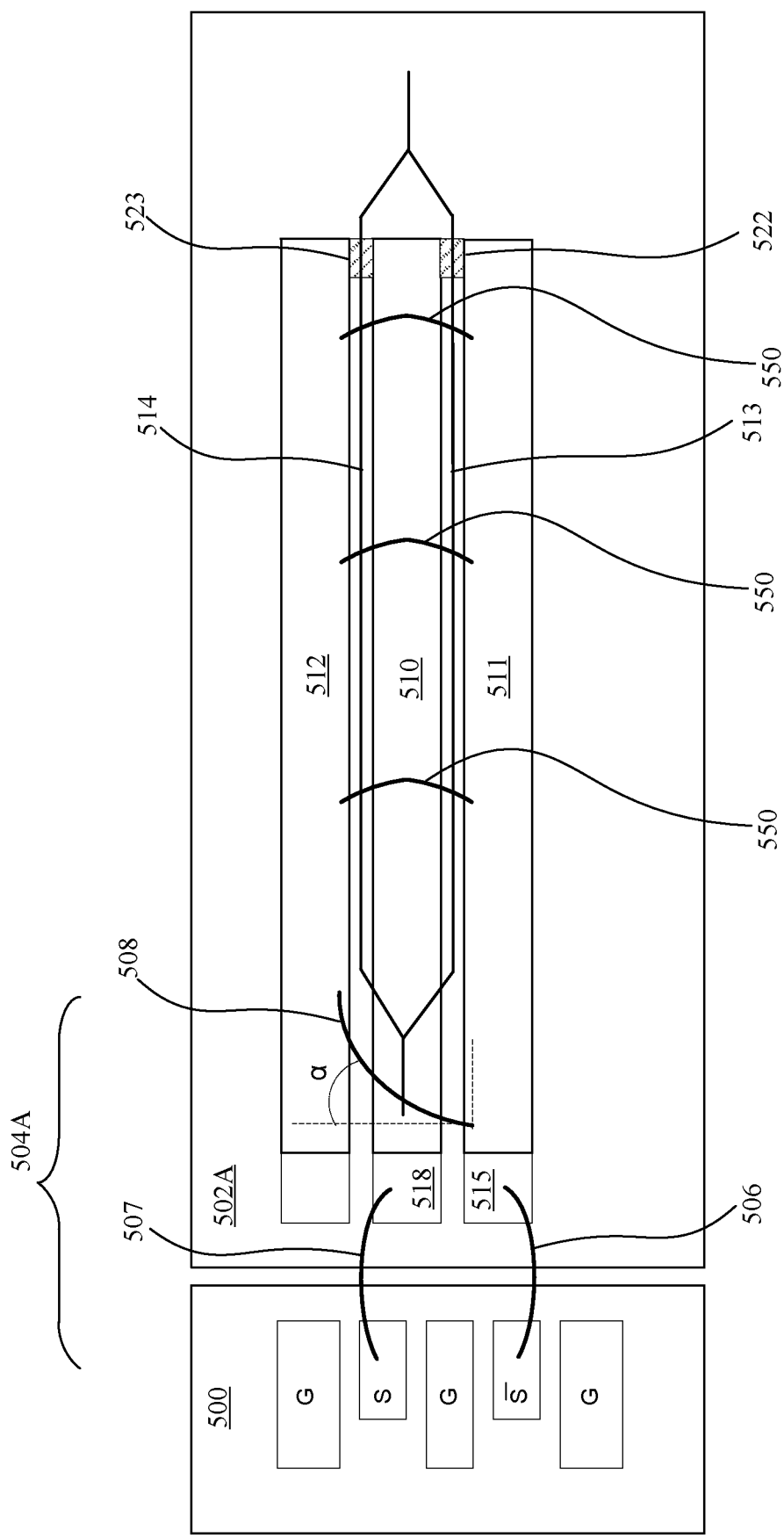
FIGS. 5A, 5B, and 5C are schematic diagrams of example driver and modulator devices.
Figure 5B:
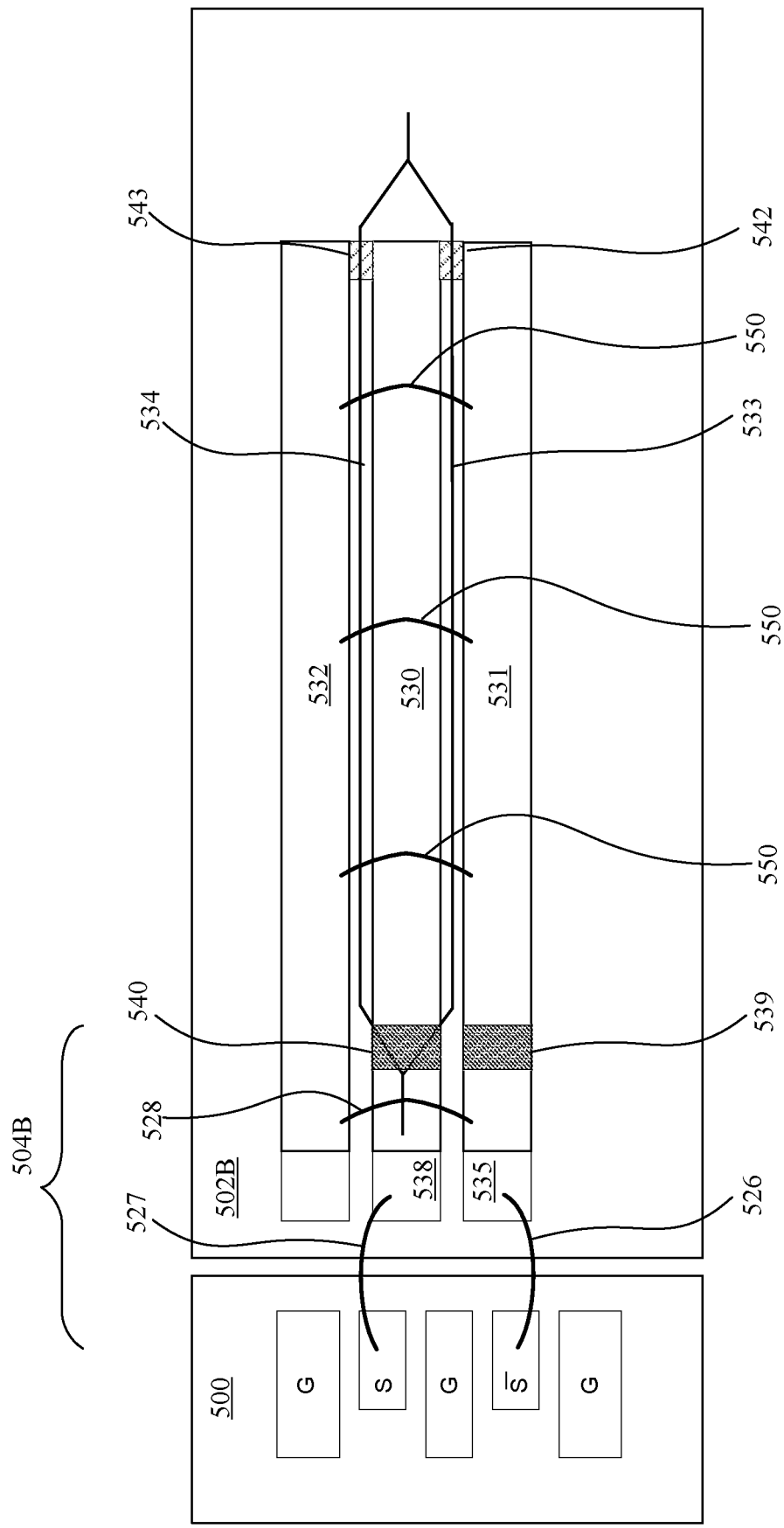

Some approaches for interconnecting a 2-port driver to a modulator are based on an asymmetric delay-matching technique for preserving the phases of the two $\bar{S}$ signals. FIGS. 5A and 5B show implementations for interconnecting driver signals from two output ports of a driver chip to input ports of an optoelectronic chip containing a TW-MZM. In these implementations, a wire-bond splits the $\bar{S}$ signal on the optoelectronic chip on a portion of the electrodes that form transmission lines of the TW-MZM. Both implementations use a $\bar{S}$-S-$\bar{S}$ electrode configuration. Also, in both implementations, the rf path lengths for the two $\bar{S}$ signals and the S signal are all substantially equal, from the output ports of the driver to the terminations of the transmission lines of the TW-MZM. Optionally, one or more impedance transforming structures can also be used in these implementations, but are not explicitly shown.

Referring to FIG. 5A, a driver chip 500 is connected to an optoelectronic chip 502A by a drive signal interconnection structure 504A that is formed by wire-bonds 506, 507, and 508. A TW-MZM is formed on the optoelectronic chip 502A by structures that include a center electrode 510, outer electrodes 511 and 512, and a Mach-Zehnder interferometer with waveguide arms 513 and 514. The wire-bond 506 is formed between an $\bar{S}$ contact pad of the driver chip 500 and an outer electrode contact pad 515. The wire-bond 507 is formed between an S contact pad of the driver chip 400 and a center electrode contact pad 518. The wire-bond 508 connects a portion of the outer electrode 511 contiguous with the contact pad 515 to a portion of the outer electrode 512 on the other side of the center electrode 510. The wire-bond 508 is angled forward by an angle α to prevent what would be a relative time delay (also called rf skew) between the two $\bar{S}$ signals propagating along the outer electrodes 511 and 512. This wire-bond 508 is located over the unloaded section (i.e., the section before MZM waveguide arms) of the TW-MZM.

At the end of each transmission line is a termination structure that has an impedance that is substantially equal to a characteristic impedance of that transmission line. In this example, the termination structures 522 and 523 have impedances that are substantially matched over the rf spectrum of drive signals that will be provided by the driver chip 500.

Figure 5C:
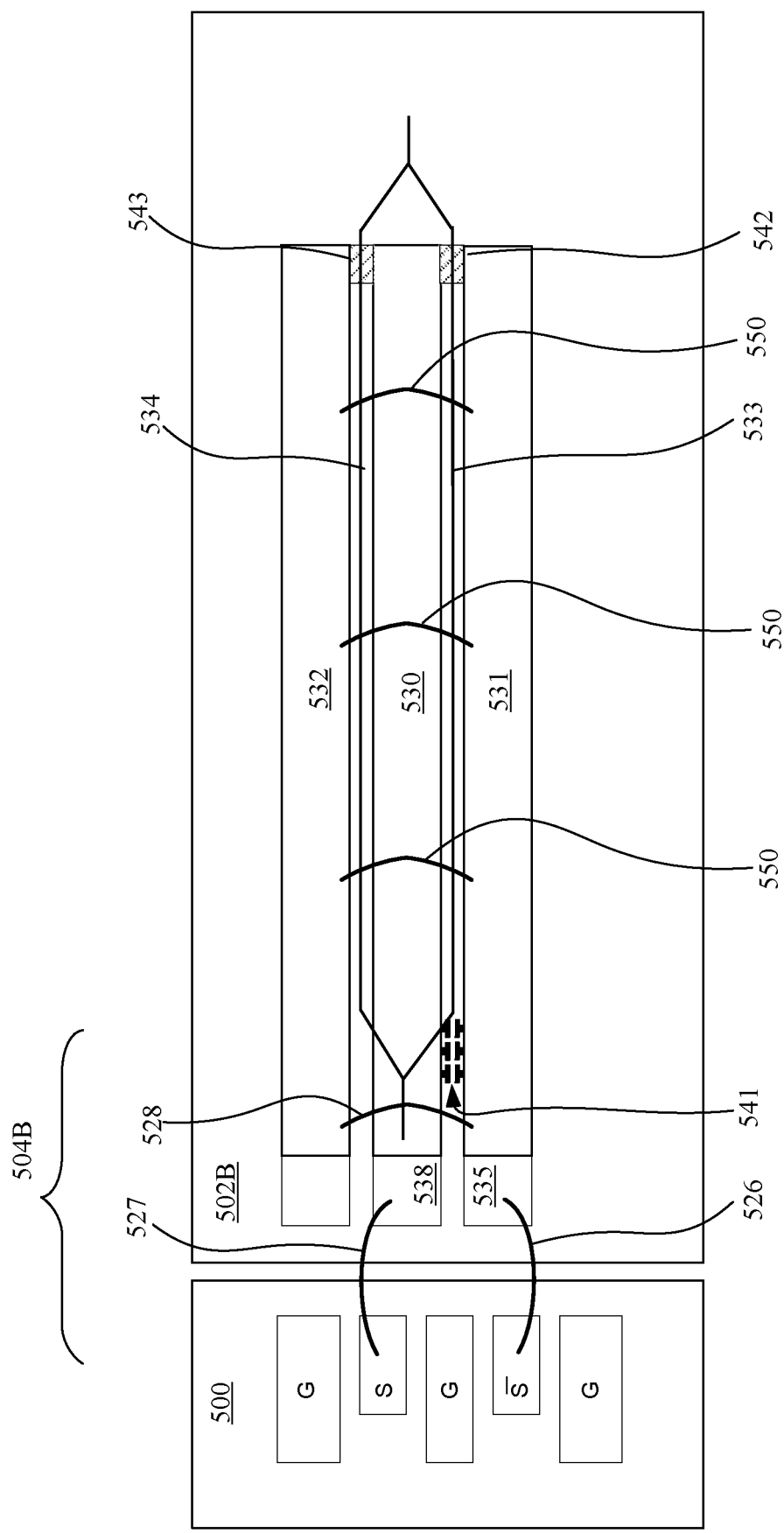

Referring to FIG. 5B, the driver chip 500 is connected to an optoelectronic chip 502B by a drive signal interconnection structure 504B that is formed by wire-bonds 526, 527, and 528. A TW-MZM is formed on the optoelectronic chip 502B by structures that include a center electrode 530, outer electrodes 531 and 532, and a Mach-Zehnder interferometer with waveguide arms 533 and 534. The wire-bond 526 is formed between an $\bar{S}$ contact pad of the driver chip 500 and an outer electrode contact pad 535. The wire-bond 527 is formed between an S contact pad of the driver chip 400 and a center electrode contact pad 538. The wire-bond 528 connects a portion of the outer electrode 531 contiguous with the contact pad 535 to a portion of the outer electrode 532 on the other side of the center electrode 530. The wire-bond 528 is not angled forward in this implementation, but instead the relative time delay caused by the signal propagation time over the wire-bond 528 is compensated for by a delay element 539 built into a portion of the electrode 531 to remove any relative time delay between the two $\bar{S}$ signals propagating along the outer electrodes 531 and 532. There is also a delay element 540 built into a portion of the center electrode 530 to remove any relative time delay between the S signal and the two $\bar{S}$ signals. The delay elements 539 and 540 can be formed, for example, by an extra length of transmission line (e.g., extra curvature), or by local substrate/cladding removal as to adjust the microwave group index. Alternatively, a slow wave structure such as a sub-wavelength patterned periodic structure can be used. For example, FIG. 5C shows an example implementation of such periodic structure delay elements on the electrodes 530 and 531 provided by T-rails 541. This wire-bond 528 is also located over the unloaded section (i.e., the section before the MZM waveguide arms) of the TW-MZM.

At the end of each transmission line is a termination structure that has an impedance that is substantially equal to a characteristic impedance of that transmission line. In this example, the termination structures 542 and 543 have impedances that are substantially matched over the rf spectrum of drive signals that will be provided by the driver chip 400.

In both optoelectronic chips 502A and 502B, TW-MZM includes periodic wire-bonds 550 joining the two outer electrodes along the TW-MZM structure. Alternatively, in implementations fabricated using a back-end process that allows for multiple metal layers, the the periodic wire-bonds can be replaced by periodic crossings in a second metal layer, for example. Whether using wire-bonds or a second metal layer, these periodic conductive connections enable more uniform propagation of the $\bar{S}$ signals over the two outer electrodes in both optoelectronic chips 502A and 502B. Such, periodic conductive connections between the outer electrodes can also be included in the optoelectronic chips 402A and 402B.

Additionally, in some alternative implementations, an impedance buffer can be included at the start of the TWMZM in the optoelectronic chips 502A and 502B if the input impedances between the input port for the $\bar{S}$ signal pair and input port for the S signal are not substantially equal.

Other implementations are possible in which the signal interconnection structures are configured for skew matching such that the propagation delays for the $\bar{S}$ signal paths and the S signal path are substantially equal across the drive signal interconnection structure and the TW-MZM structure.

In some implementations, a driver chip, such as the driver chip 400 or the driver chip 500, can be configured for attachment using different fabrication techniques. For example, a controlled collapse chip connection, also called flip-chip or C4 connection (e.g., using solder bumps and copper pillars), can be used to connect the driver chip directly to the optoelectronic chip. In a flip-chip driver implementation, the longer wire-bond 408 in the implementation of FIG. 4A could be replaced by a delay within the driver chip 400 so that the $\bar{S}$ and S signals arrive at the same time at the portion of the TW-MZM where the modulation starts. Alternatively, a longer trace could be integrated in a substrate common to the driver chip 400 and the optoelectronic chip 402A.

Alternatively, in some implementations, a substrate or interposer chip can be used between the driver chip and the optoelectronic chip, in which case, any portion of the periodic conductive connections and/or delay-matching structures could be formed on the substrate or interposer without requiring use of wire-bonds. Alternatively, if a back-end process allows for additional redistribution layers (e.g., PI/Cu on top of the existing passivation) any portion of the periodic conductive connections and/or delay-matching structures could be formed through the redistribution layers.

Figure 6A:
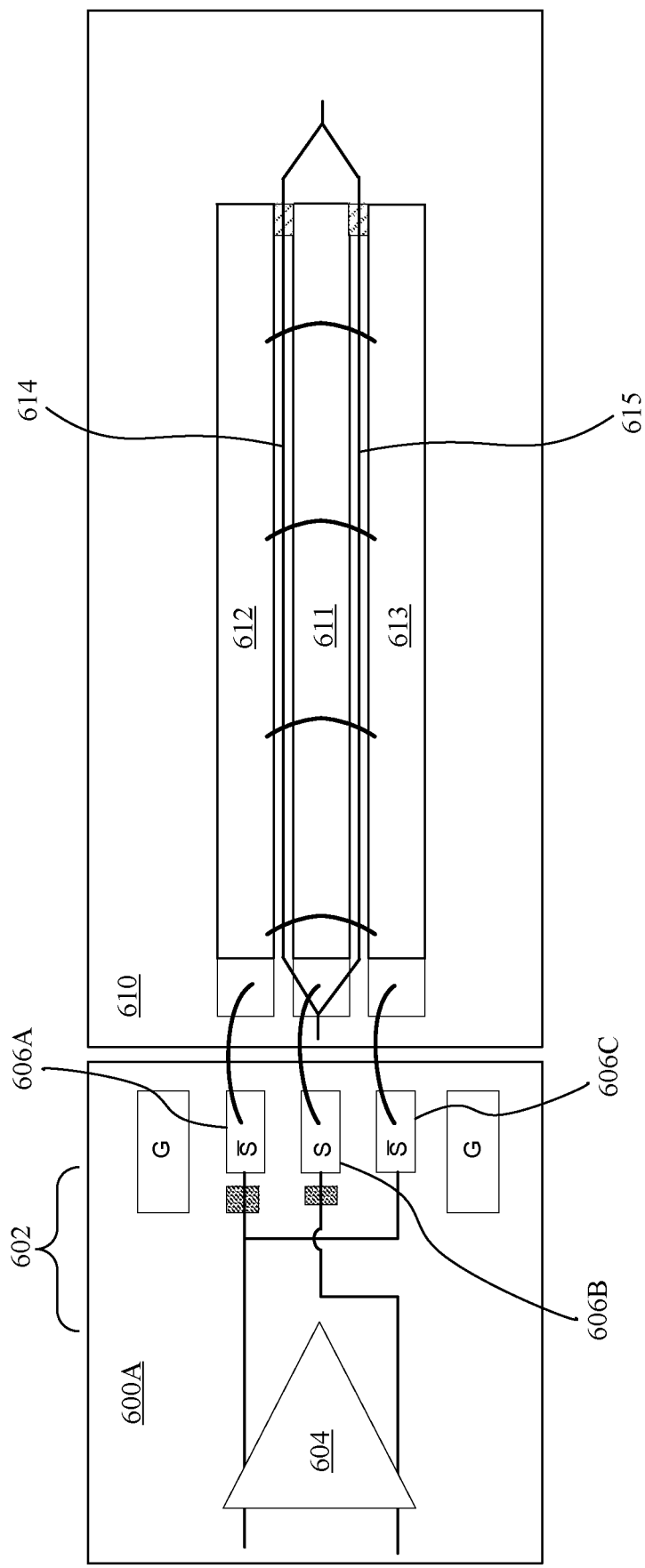
FIGS. 6A and 6B are schematic diagrams of example driver and modulator devices.

Some approaches interconnect a 3-port driver to a modulator, where the modulator includes a contact pad for a single S signal and two separate contact pads for two different $\overline{S}$ signals. FIG. 6A shows a technique in which splitting of the $\overline{S}$ signal occurs within a driver chip 600A using signal splitting circuitry 602 at an output of a differential-output driver circuit 604 and prior to the output contact pads 606A, 606B, and 606C. This example enables impedance matching, delay matching, and impedance transformation close to the driver circuit 604, which can mitigate reflections and can be managed on a sub-micron scale within the driver chip 600A. The contact pads 606A, 606B, and 606C are connected (e.g., using wire-bonds) to corresponding contact pads on an optoelectronic chip 610. A TW-MZM is formed on the optoelectronic chip 610 by structures that include a center electrode 611, outer electrodes 612 and 613, and a Mach-Zehnder interferometer with waveguide arms 614 and 615.

Figure 6B:
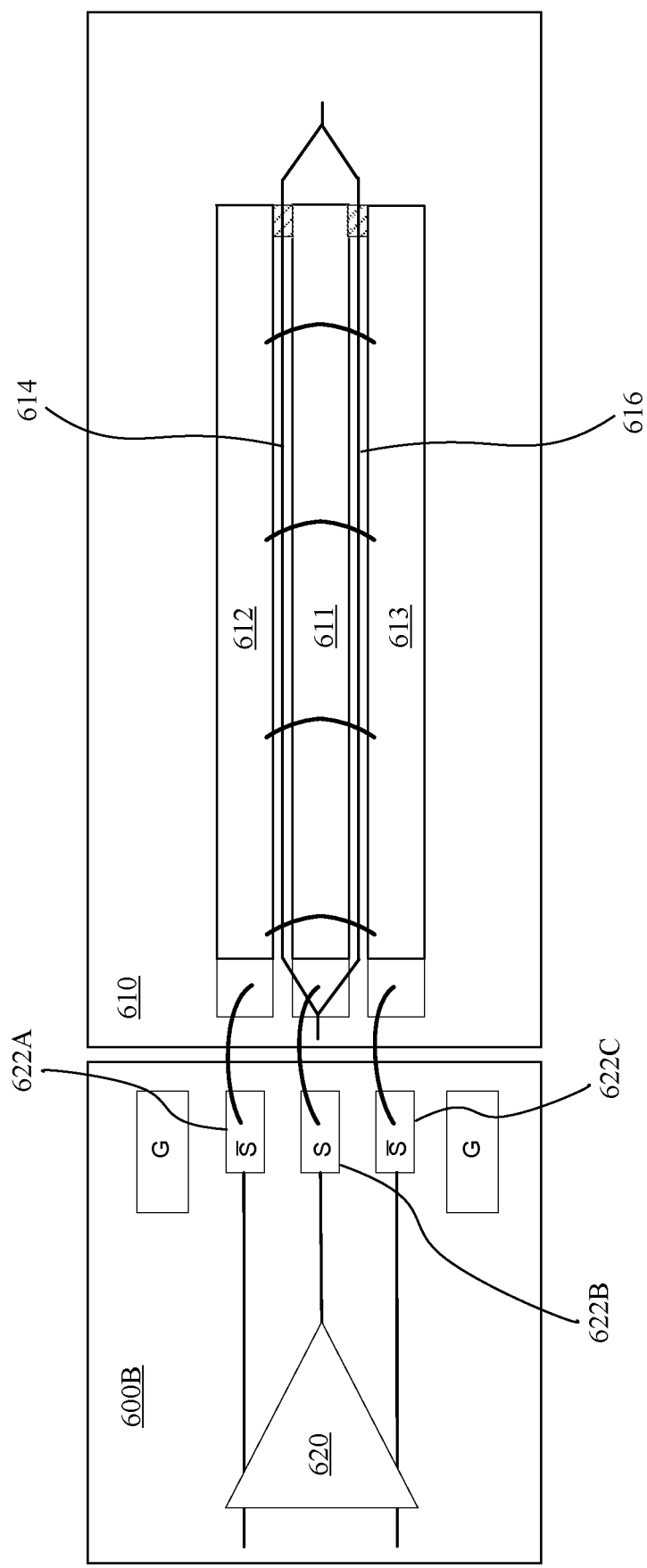

FIG. 6B shows a technique in which splitting of the $\overline{S}$ signal occurs within a driver chip 600B using transistor-level circuitry within a differential-output driver circuit 620 that has three output wires connected directly to respective output contact pads 622A, 622B, and 622C. This example enables two versions of the $\overline{S}$ signal to be provided, and the transistor-level circuitry can be configured to be compatible with either voltage mode or current mode driver circuitry. The contact pads 622A, 622B, and 622C are connected (e.g., using wire-bonds) to corresponding contact pads on the optoelectronic chip 610.

Figure 7A:
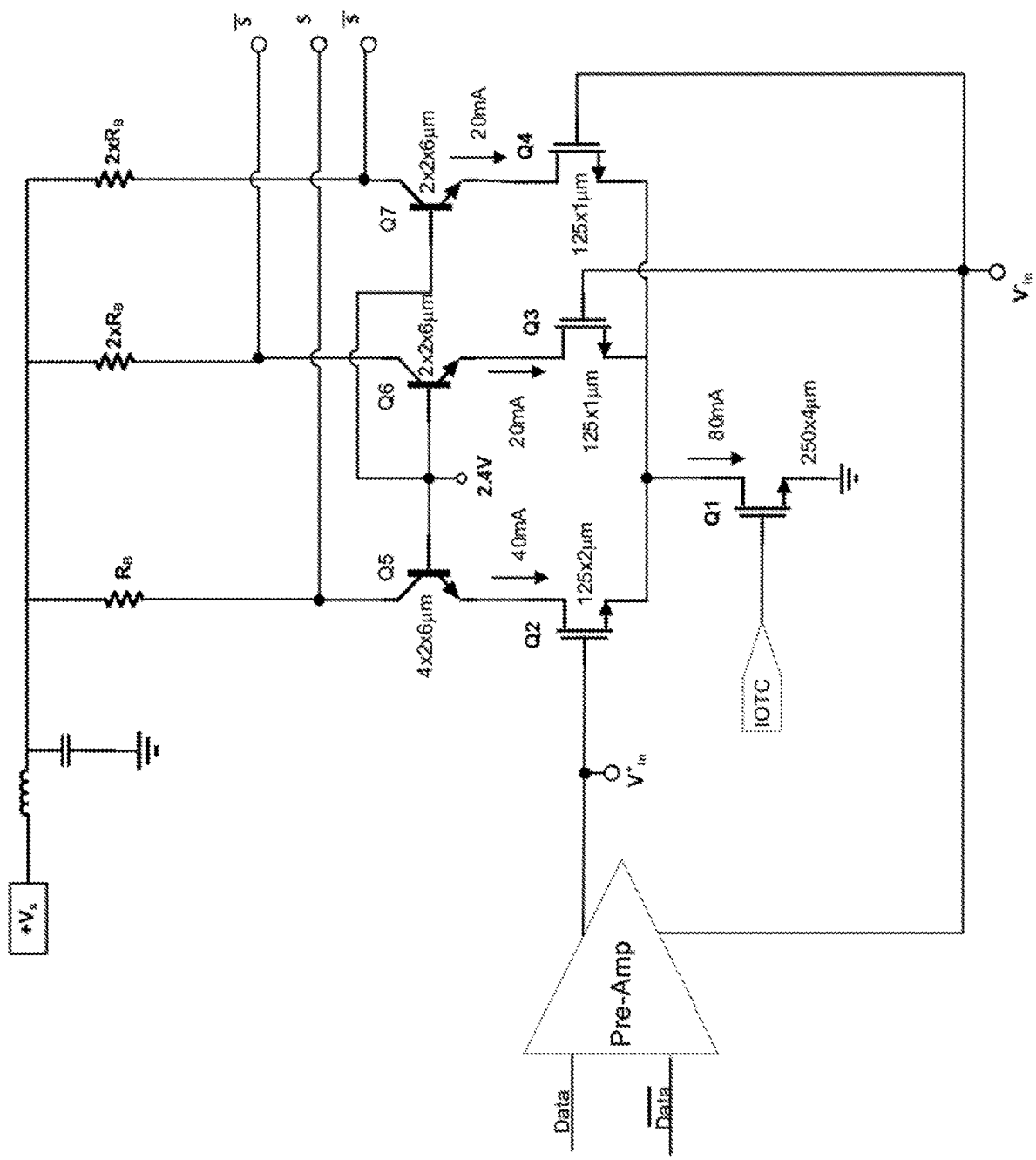
FIGS. 7A, 7B, and 7C are circuit diagrams of example driver circuits.
Figure 7B:
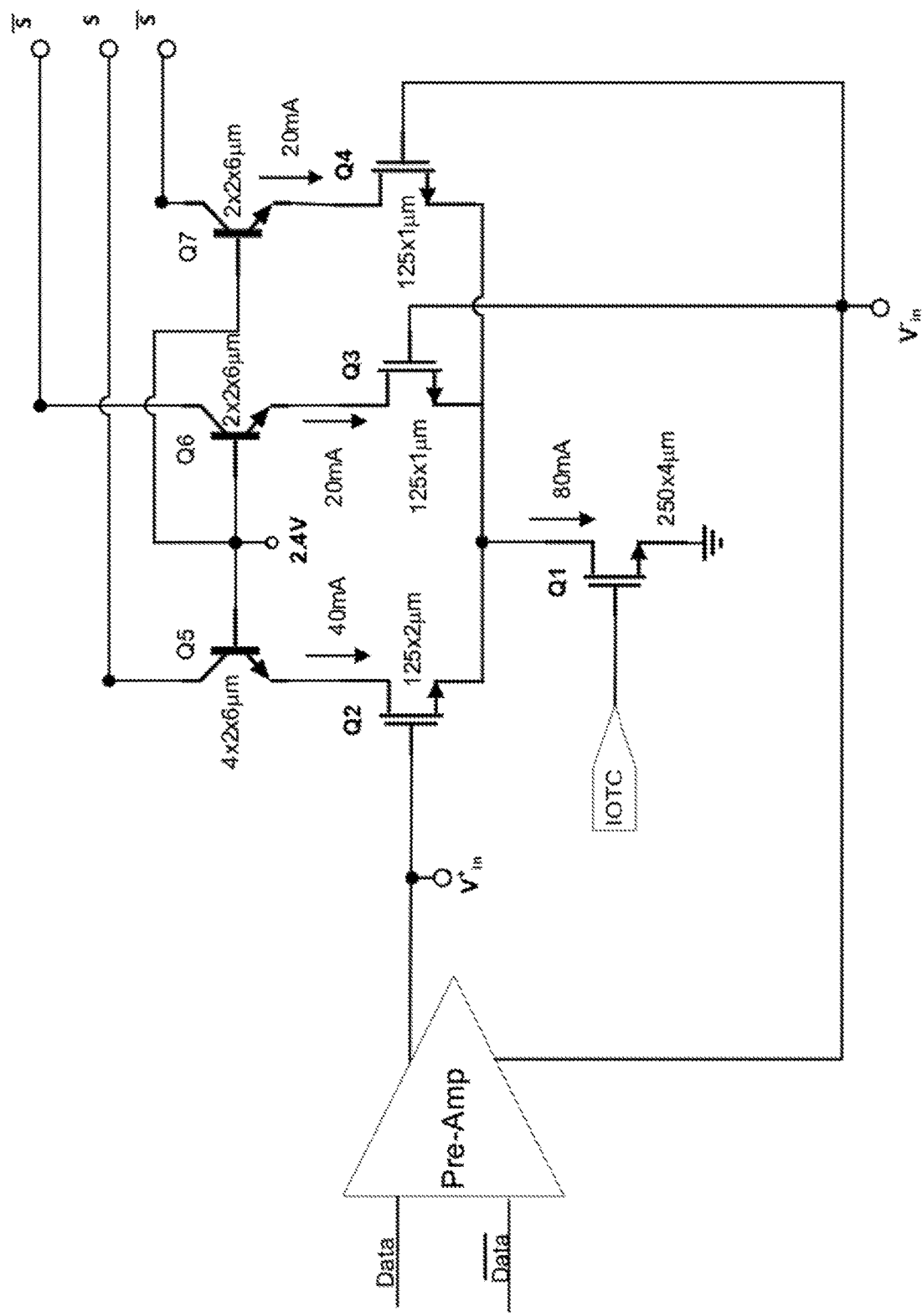
Figure 7C:
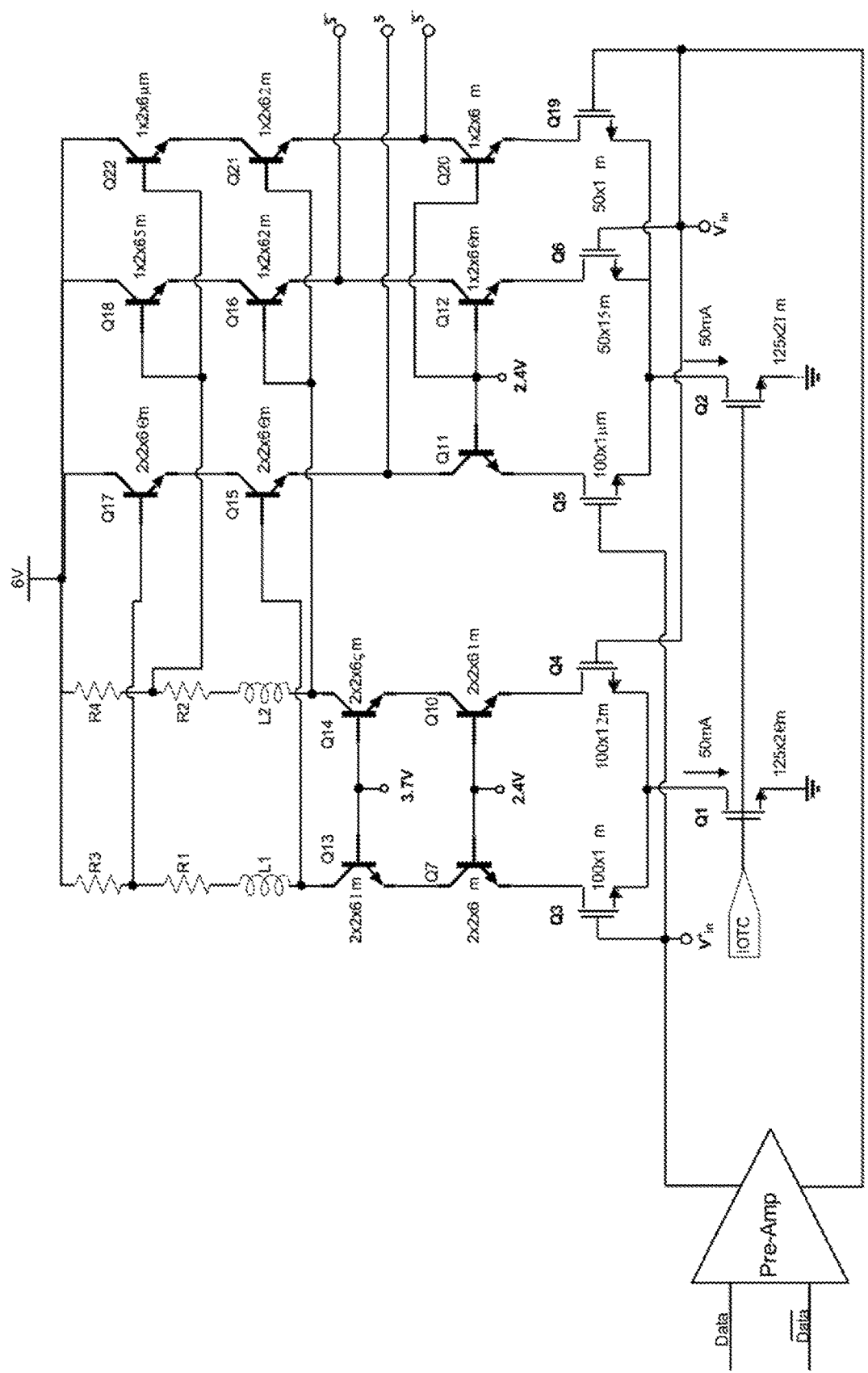

FIGS. 7A, 7B, and 7C show example implementations of the differential-output driver circuit 620. Referring to FIG. 7A, a back terminated current mode driver configuration is shown, where the $\overline{S}$ signal is split using half sized transistors double the pull up resistor compared to the S signal. Referring to FIG. 7B, an open collector current mode driver configuration is shown, where the $\overline{S}$ signal is split using half sized transistors compared to the S signal. Referring to FIG. 7C, a double emitter follower push pull (DEFPP) voltage mode driver is shown, where the $\overline{S}$ signal is split using half sized transistors double the pull up resistor compared to the S signal. The configuration of the transistors and metal conducting paths within the circuits can be arranged differently in the integrated circuit that in the circuit diagrams shown. For example, in some implementations the transistor providing the S signal is positioned between transistors providing the different $\overline{S}$ signals.

Figure 8:
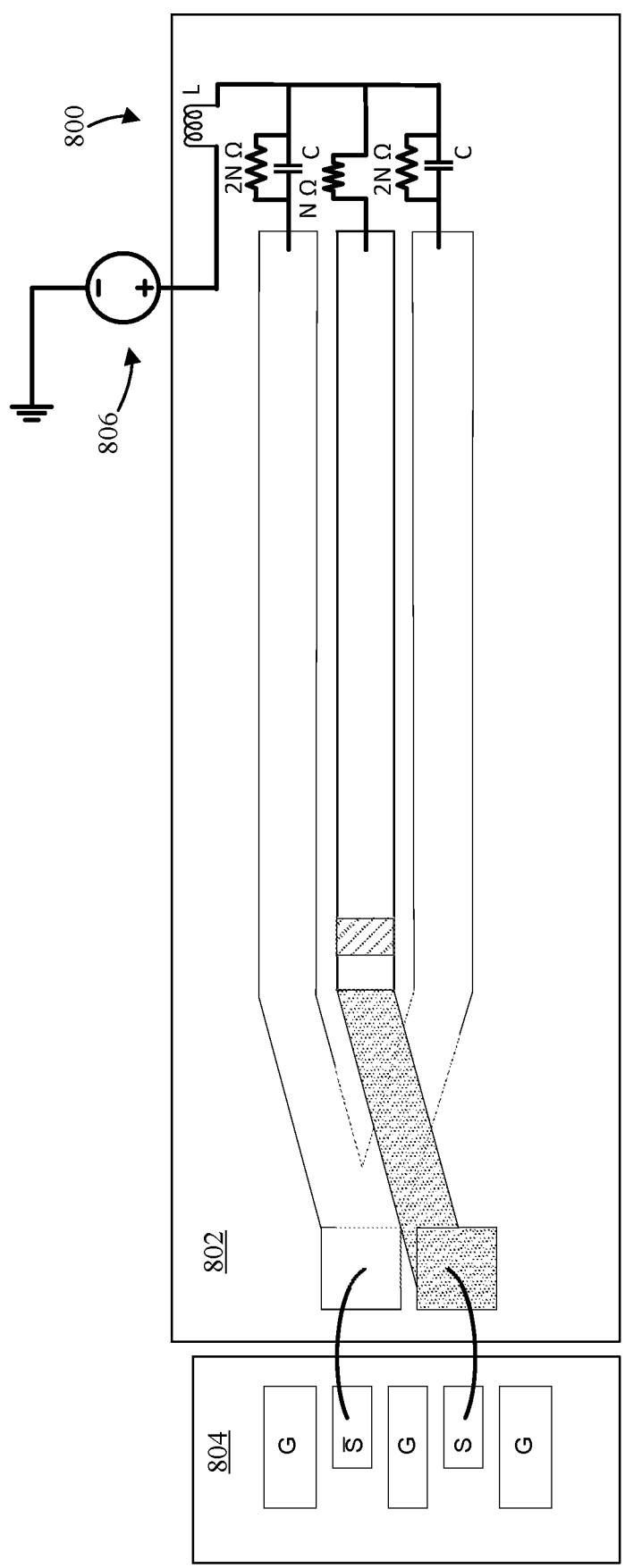
FIG. 8 is a schematic diagram of an example bias circuit.

FIG. 8 shows an example of a bias circuit 800 for terminating the transmission lines of a TW-MZM in an optoelectronic chip 802 driven by a driver chip 804 that is configured to use an open-collector driver topology/architecture. In this example, for clarity, the transmission line contacts of the TW-MZM are shown but the optical waveguide arms of the MZM are not shown. The bias circuit 800 can be used to provide RF output DC biasing for such a driver. In this example, the bias circuit 800 includes resistive elements shown in the illustrated circuit diagram as resistors having one of two resistor values 2N Ohms for the outer electrodes, and N Ohms for the center electrode. The value N is substantially equal to real part of the differential impedance of the TW-MZM Re$\{Z_{diff}\}$. The parallel capacitance for each outer electrode resistor shown in the illustrated circuit diagram as capacitors have a capacitance value C that can be determined according to an impedance matching criteria. For example, at low frequencies, the in-band capacitor impedance is selected such that $Z_C \ll N$, and the capacitance can also be set with consideration of the target low-frequency cutoff of the apparatus. The series inductance after the node combining the currents from the three paths shown in the illustrated circuit diagram as an inductor has an inductance value L that is high enough to be substantially equal to an ideal choke preventing RF power from propagating into the bias circuit 800. A voltage source 806, which can be connected from off-chip, provides a constant (DC) voltage for the bias circuit 800. The resistive elements, capacitive elements, and inductive element can be integrated into the optoelectronic chip 802 in some implementations. In some implementations, the relatively high values of C and/or L may be provided by adding discrete passive electronic components (e.g., small form-factor Si-capacitors). In implementations in which a driver does not require RF output DC biasing (e.g., not an open-collector topology/architecture), some of the resistive elements (e.g., resistors other than the center electrode resistor), capacitive elements, and/or inductive element can be omitted.

From a DC perspective, this TW-MZM termination bias scheme works for either a $\overline{S}$ signal split on the optoelectronic chip, or on the driver chip. The DC voltage drop is the same on all three termination resistors ensuring consistent RF output DC biasing. For a split on the optoelectronic chip, driven by a 2-port driver, each pathway for the $\overline{S}$ signal receives the same bias current (e.g., half the current flow in the top and bottom MZM electrodes with respect to the center electrode, and then add up before reaching the $\overline{S}$ driver output). For a split within a 3-port driver, each path from the ports providing each of the two different versions of the $\overline{S}$ signal receives half the bias current with respect to the port providing the S signal (e.g., as in FIG. 6A or FIG. 6B). From a RF perspective, each rf travelling wave will effectively see N Ohms at the terminated end of the transmission line.

Some implementations of the interconnection structure comprise a substrate or other separate structure that enables electrode arrangements that are advantageously configured for RF signal propagation between a 2-port driver and a 3-port optoelectronic chip that contains the MZM. This intermediate interconnection structure (IIS) (also called an "RF substrate" or "RF carrier") can be implemented in a variety of ways. On advantage of such IIS is that the area on the optoelectronic chip may be a scarce resource that can be preserved for the optoelectronic circuitry rather than the relatively large electrode structures. Other advantages will be apparent from the following examples.

Figure 9A:
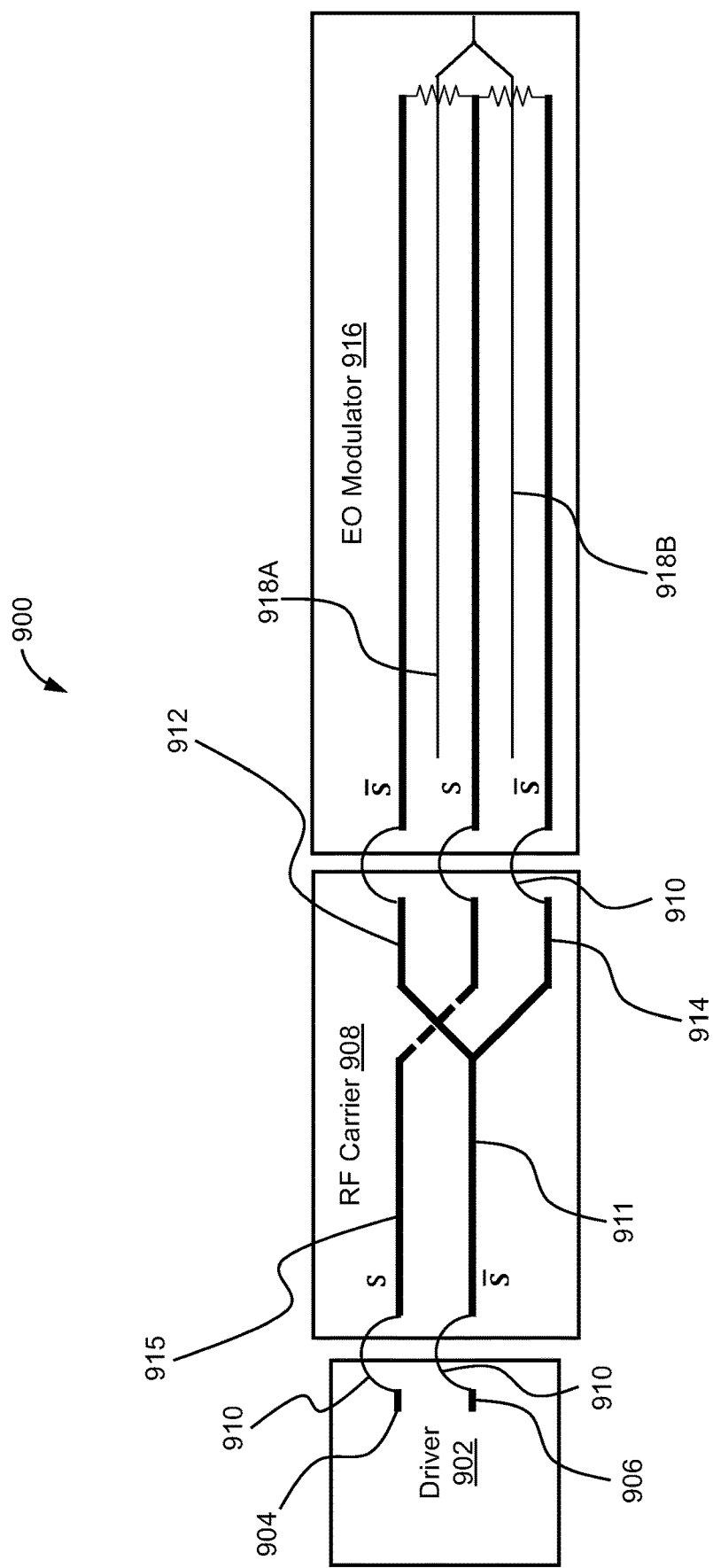
FIGS. 9A and 9B are schematic diagrams showing top and side views, respectively, of an example interconnection structure arrangement.
Figure 9B:
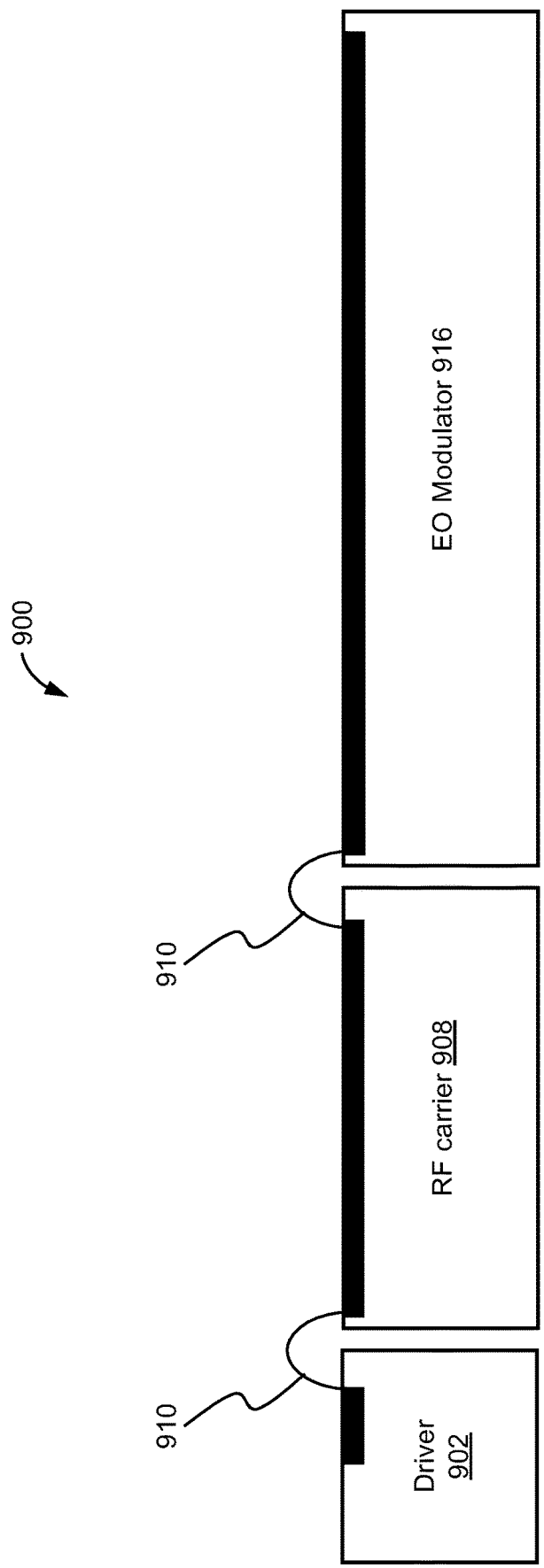
Figure 10A:
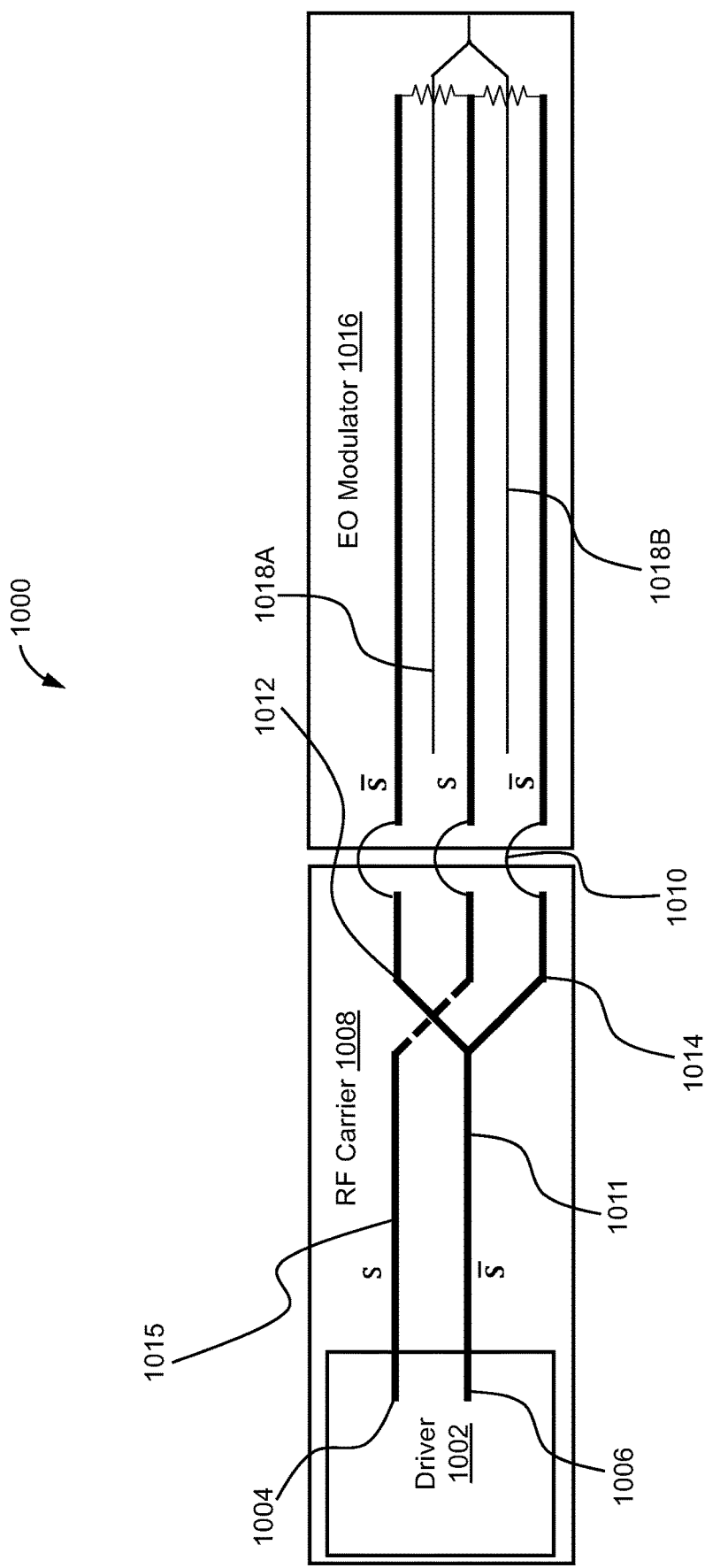
FIGS. 10A and 10B are schematic diagrams showing top and side views, respectively, of an example interconnection structure arrangement.
Figure 10B:
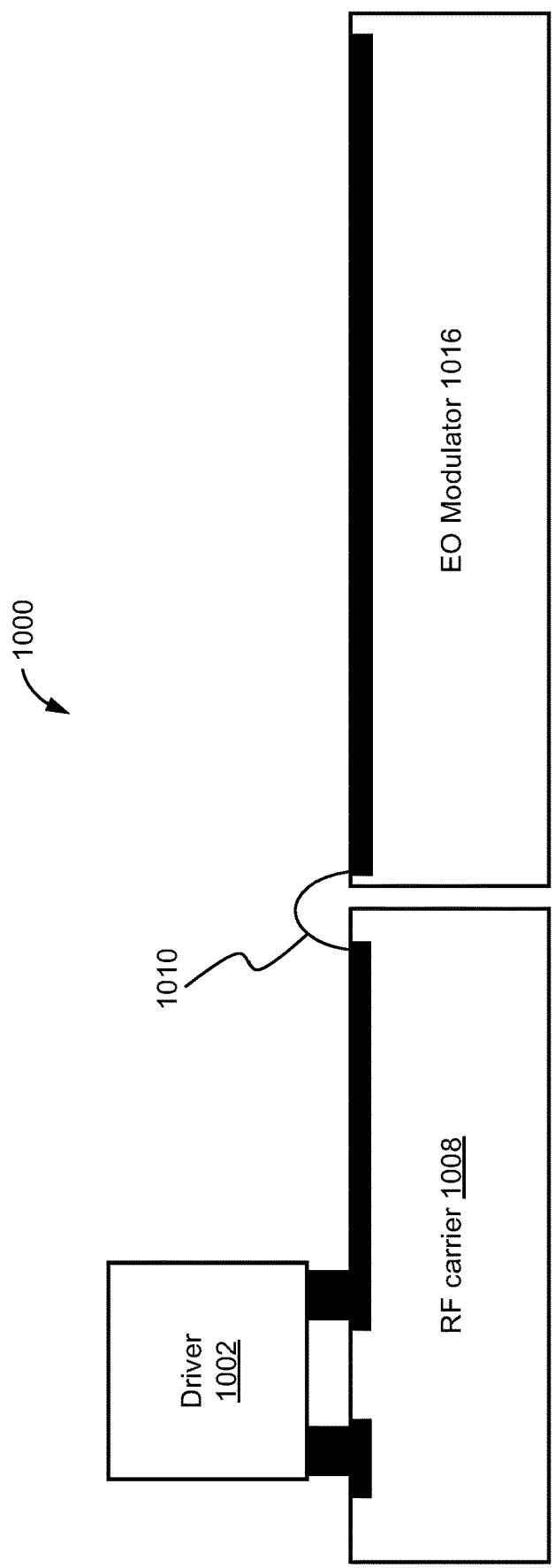

An IIS can be implemented in any of a variety of ways. For example, in some implementations, the IIS comprises an RF carrier between a wire-bonded 2-port driver providing an S and $\overline{S}$ signal and a wire-bonded 3-port TFLN chip on which the MZM is fabricated (e.g., as shown in FIGS. 9A-9B). In some implementations, the IIS comprises an RF carrier on which the 2-port driver is mounted (e.g., using a controlled collapse chip connection, also called a flip-chip connection) (e.g., as shown in FIGS. 10A-10B). In some implementations, there is an integrated passive device (IPD) such a silicon chip (also called an RF riser) mounted on the same RF carrier on which the driver is mounted. A main purpose of the RF riser is to raise an electrode structure carrying the RF signal from a surface of the RF carrier to a height that is appropriate for connection to the TFLN chip, which can reduce loss that may otherwise be associated with use of long wire-bonds. The RF carrier may be made of the any of a variety of materials, including the following: organic substrates (HDBU, PCB, SLP, 'Flex PCB'), ceramics (HTCC, LTCC, thin-film AlN or Al2O3), and/or semiconductors (e.g., Si).

Some implementations of the IIS include two main electrode portions: a splitter portion and a lateral translation or "cross-over" portion. The splitter portion can comprise a broadband (~10 MHz-100 GHz), ideally low-loss RF splitter for the $\bar{S}$ signal out of the driver. The phase of the two $\bar{S}$ signal versions (after the split) is arranged to be the same, and opposite of the phase of S signal. The lateral translation portion can comprise an RF crossing, whereby the S signal out of the driver, which doesn't get split, is routed so that it is located physically in-between the two versions of the $\bar{S}$ signal (before, at, or after its splitting). This calls for, in some cases, the availability of either wire-bonds, a second RF metal layer integrated on the RF carrier, and vias, or a redistribution layer (e.g., on the RF Riser).

Figure 11A:
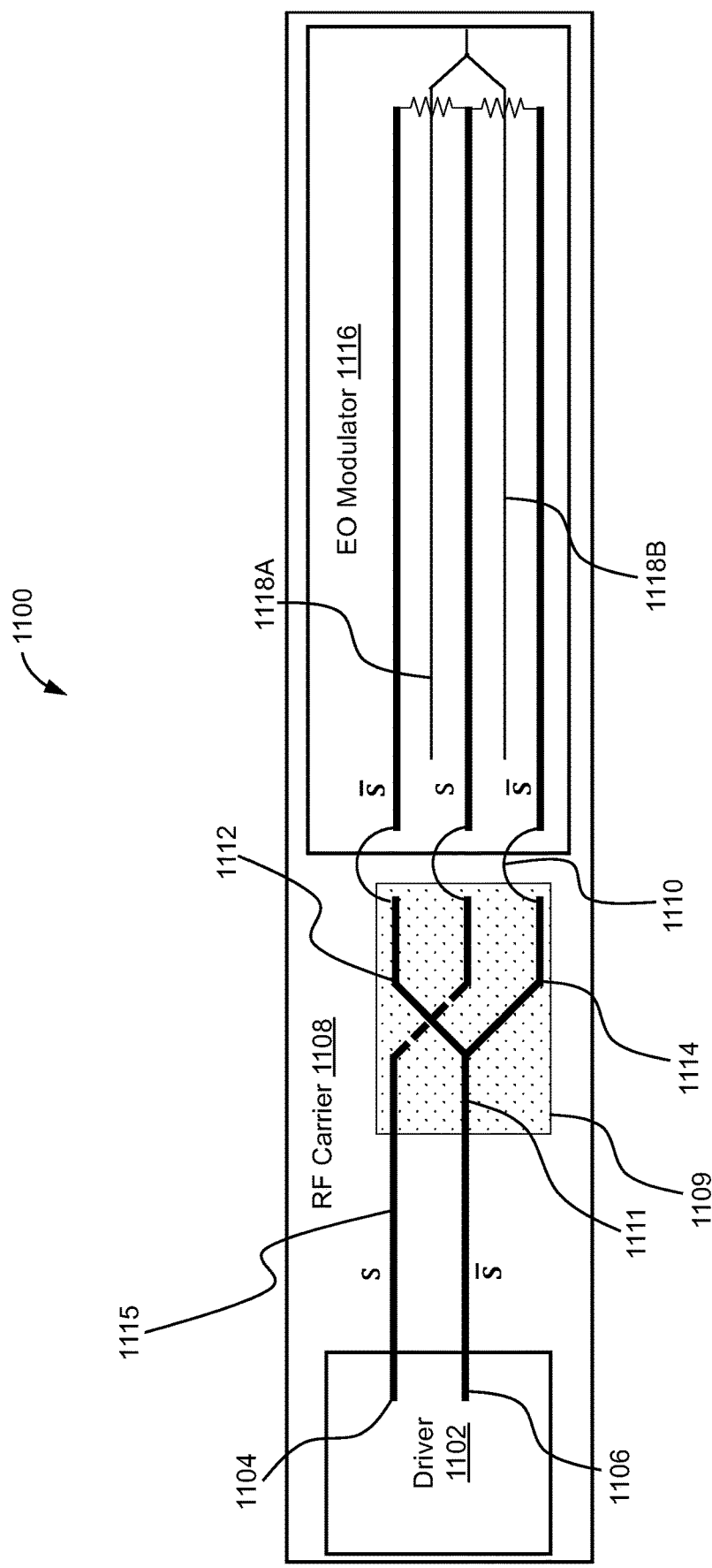
FIGS. 11A and 11B are schematic diagrams showing top and side views, respectively, of an example interconnection structure arrangement.
Figure 11B:
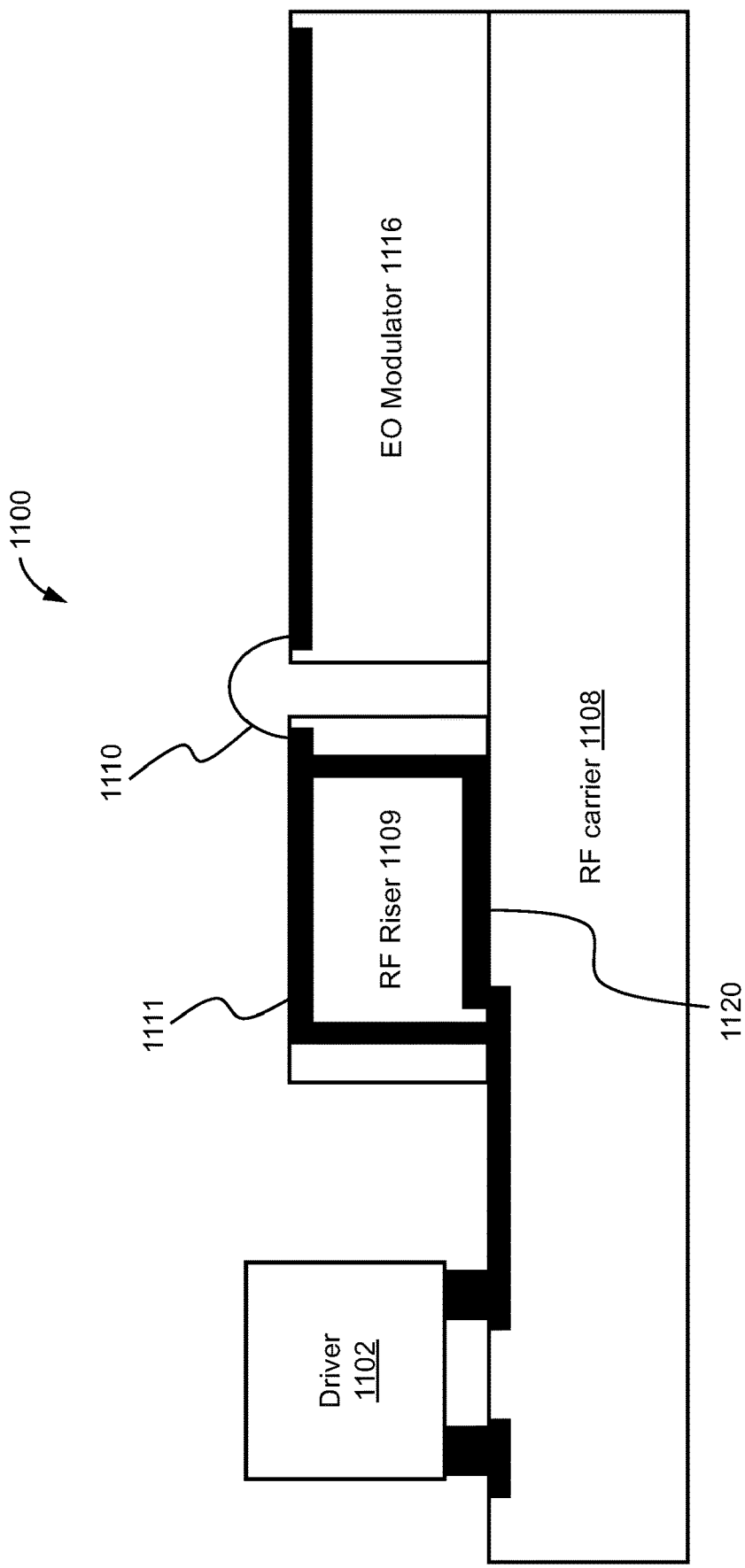
Figure 12A:
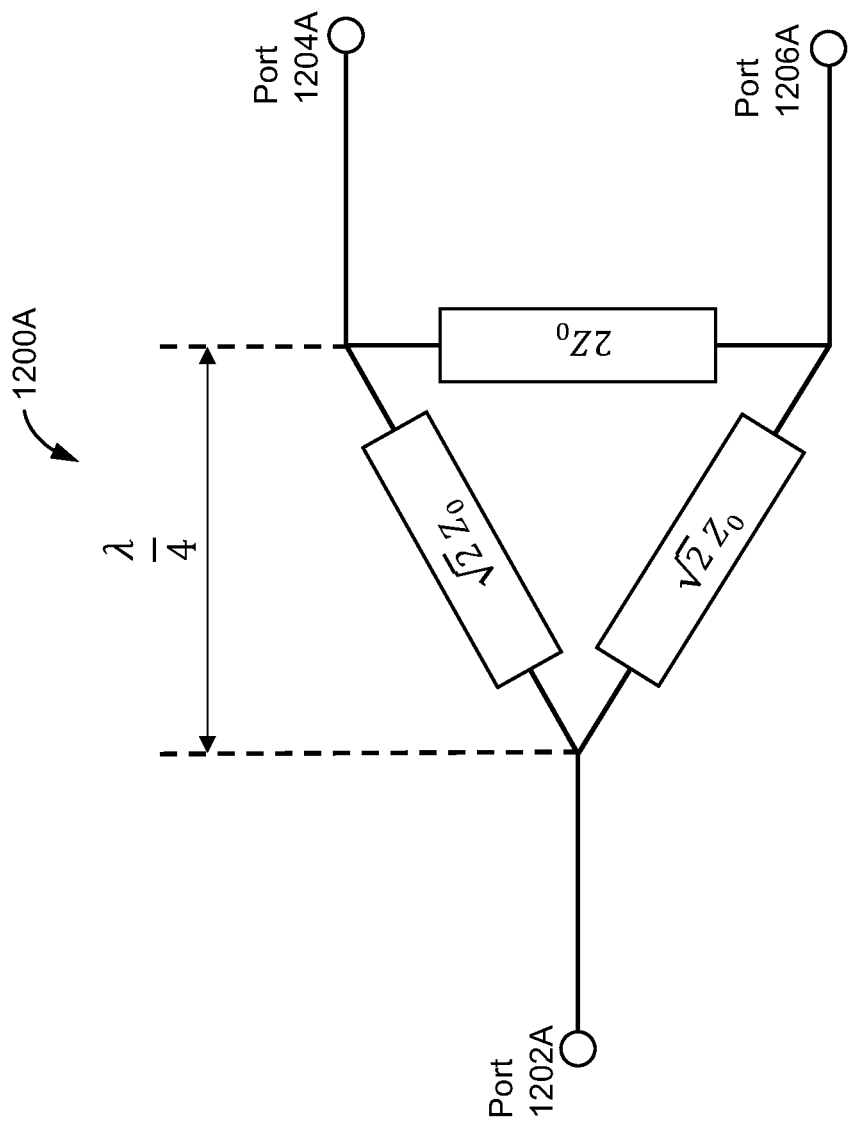
FIGS. 12A, 12B, and 12C are circuit diagrams of example splitter configurations.
Figure 12B:
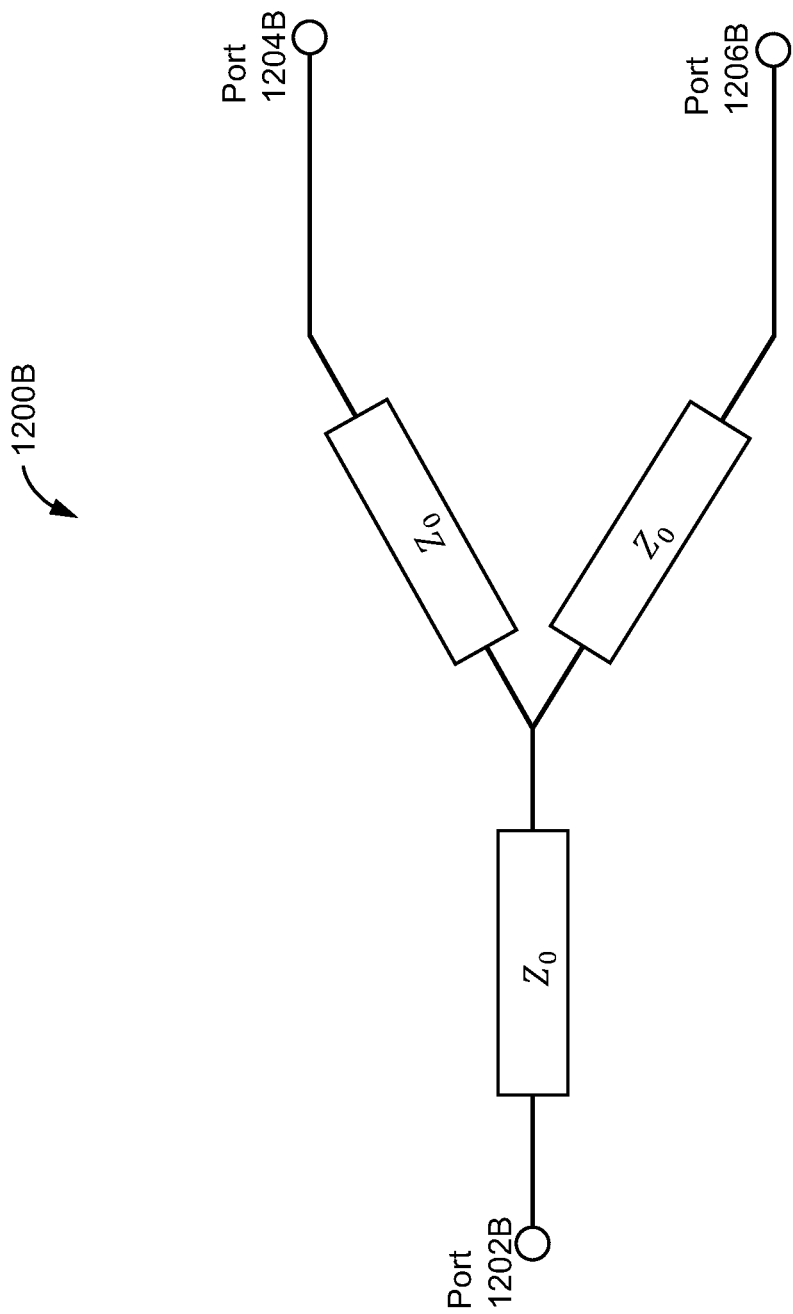
Figure 12C:
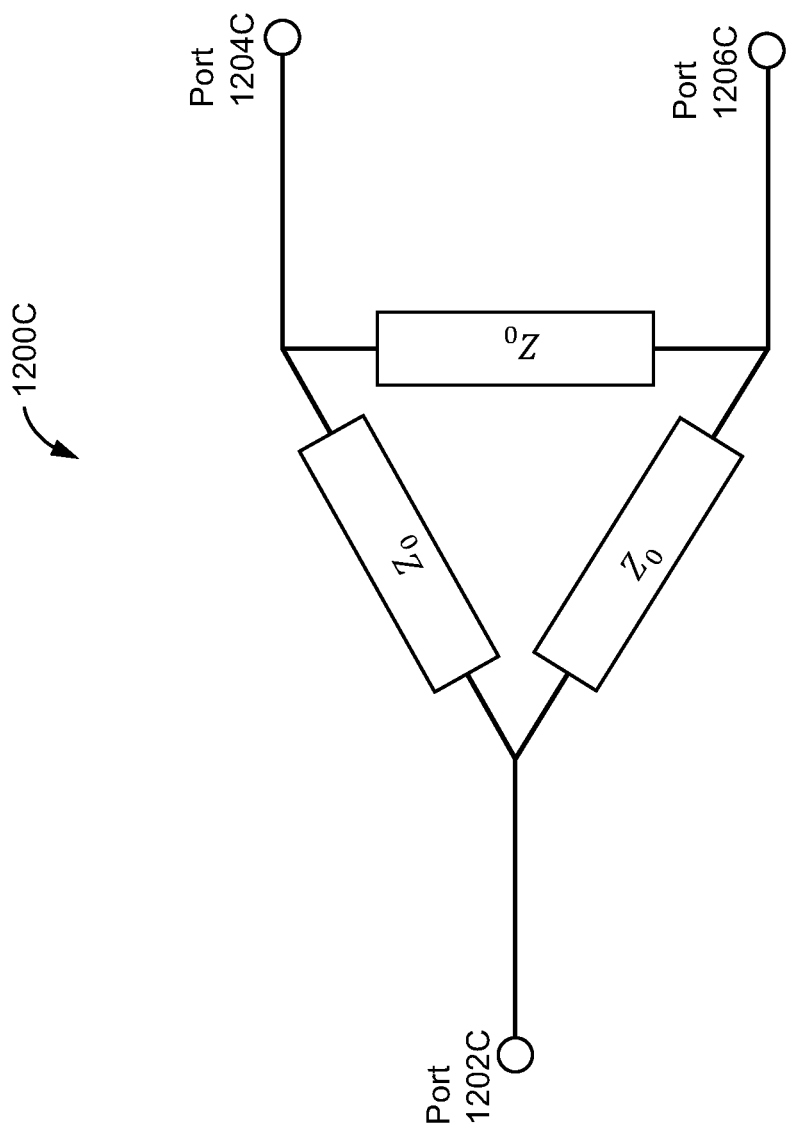

Optional features that can be incorporated into some implementations, in addition to the simple RF y-branch splitter design shown in FIGS. 9A-9B, 10A-10B, and 11A-11B, include a Wilkinson splitter (e.g., FIG. 12A), a Wye 6 dB resistive splitter (e.g., FIG. 12B), and a Delta 6 dB resistive splitter (e.g., FIG. 12C). Moreover, a hybrid between a "lossless" y-branch splitter and resistive splitters such as the Wye, Wilkison, and Delta 6 dB resistive splitters can be implemented, for example, by incorporating some level of resistive loss (e.g., through doped silicon or TiN/TaN integrated resistors) in some locations of the IIS to help with matching or tuning of some circuit parameters (e.g., impedance, phase, amplitude or other parameters). Such splitter designs may be employed in 2-port to 3-port or 4-port to 5-port RF interconnect structures (e.g., FIGS. 9A-9B, 10A-10B, 11A-11B, 13B, and 14B-14D). When combined with crossing/translation of a second, complementary signal, such an IIS may allow for the conversion of a differential signal pair (e.g., from two ports of a conventional differential driver) to a 3-port transmission line that may then be used as input to other devices (e.g., a linear EO MZM of the type $\bar{S}$-S-$\bar{S}$/G-$\bar{S}$-G-$\bar{S}$-G).

FIGS. 9A-9B, 10A-10B, and 11A-11B show various example configurations for implementing a driver complement split using an arrangement of electrodes on an interconnection structure.

FIGS. 9A and 9B show a top view and a side view of a cross-sectional area, respectively, of an example interconnection structure 900 that is configured to receive signals from a 2-port differential driver chip 902 that outputs a first signal on a first output port 904 (e.g., a signal S) and a second signal on a second output port 906 (e.g., a signal $\bar{S}$), where the first and second signals are complementary to each other. The two output ports are electrically connected to corresponding input ports of electrodes on an RF carrier 908 by wire-bonds 910. The second signal is split from an input arm 911 of a splitter electrode into a third signal on one output arm 912 of the splitter electrode, and a fourth signal on the other output arm 914 of the splitter electrode, where the third and fourth signals are substantially identical versions of the second signal (e.g., $\bar{S}$). The first signal is propagated to the portion of the RF carrier 908 after the split portion of the splitter electrode by a cross-over electrode 915, which crosses over or under the arm 912 to provide the first signal on a portion of the cross-over electrode 915 between the two arms 912 and 914. In this manner, the RF carrier 908 is able to provide a 3-port RF output from the 2-port RF output of the driver chip 902, and connect to the 3-port RF input of an EO modulator chip 916. The first signal, the third signal, and the fourth signal are electrically connected to the EO modulator chip 916 by wire-bonds 910. The EO modulator chip 916 is arranged to form a Mach-Zehnder modulator that has a waveguide arm 918A comprising EO material that is driven by an electric field between transmission line electrodes that carry the first signal and the third signal, and a waveguide arm 918B comprising EO material that is driven by an electric field between transmission line electrodes that carry the first signal and the fourth signal. The EO material in the waveguide arms has optical properties (e.g., refractive index and/or absorption) that depend on an electric field provided by the signals. The transmission line of the EO modulator chip 916 is terminated by resistively connecting the electrodes carrying the first signal and the third signal, and resistively connecting the electrodes carrying the first signal and the signal 914.

FIGS. 10A and 10B show a top view and a side view of a cross-sectional area, respectively, of an example interconnection structure 1000 that is configured to receive signals from a 2-port differential driver chip 1002 that outputs a first signal on a first output port 1004 (e.g., a signal S) and a second signal on a second output port 1006 (e.g., a signal $\bar{S}$), where the first and second signals are complementary to each other. The two output ports underneath the 2-port differential driver chip 1002 are electrically connected to corresponding input ports of electrodes on an RF carrier 1008 (e.g., by a controlled collapse chip connection, also called flip-chip or C4 connection) upon which the 2-port differential driver chip 1002 is located. The second signal is split from an input arm 1011 of a splitter electrode into a third signal on one output arm 1012 of the splitter electrode, and a fourth signal on the other output arm 1014 of the splitter electrode. The first signal is propagated to the portion of the RF carrier 1008 after the split portion of the splitter electrode by a cross-over electrode 1015, which crosses over or under the arm 1012 to provide the first signal on a portion of the cross-over electrode 1015 between the two arms 1012 and 1014. The first signal, the third signal, and the fourth signal are electrically connected to an EO modulator chip 1016 by wire-bonds 1010. The EO modulator chip 1016 is arranged to form a Mach-Zehnder modulator that has a waveguide arm 1018A comprising EO material that is driven by an electric field between transmission line electrodes that carry the first signal and the third signal, and a waveguide arm 1018B comprising EO material that is driven by an electric field between transmission line electrodes that carry the first signal and the fourth signal.

Figure 11C:
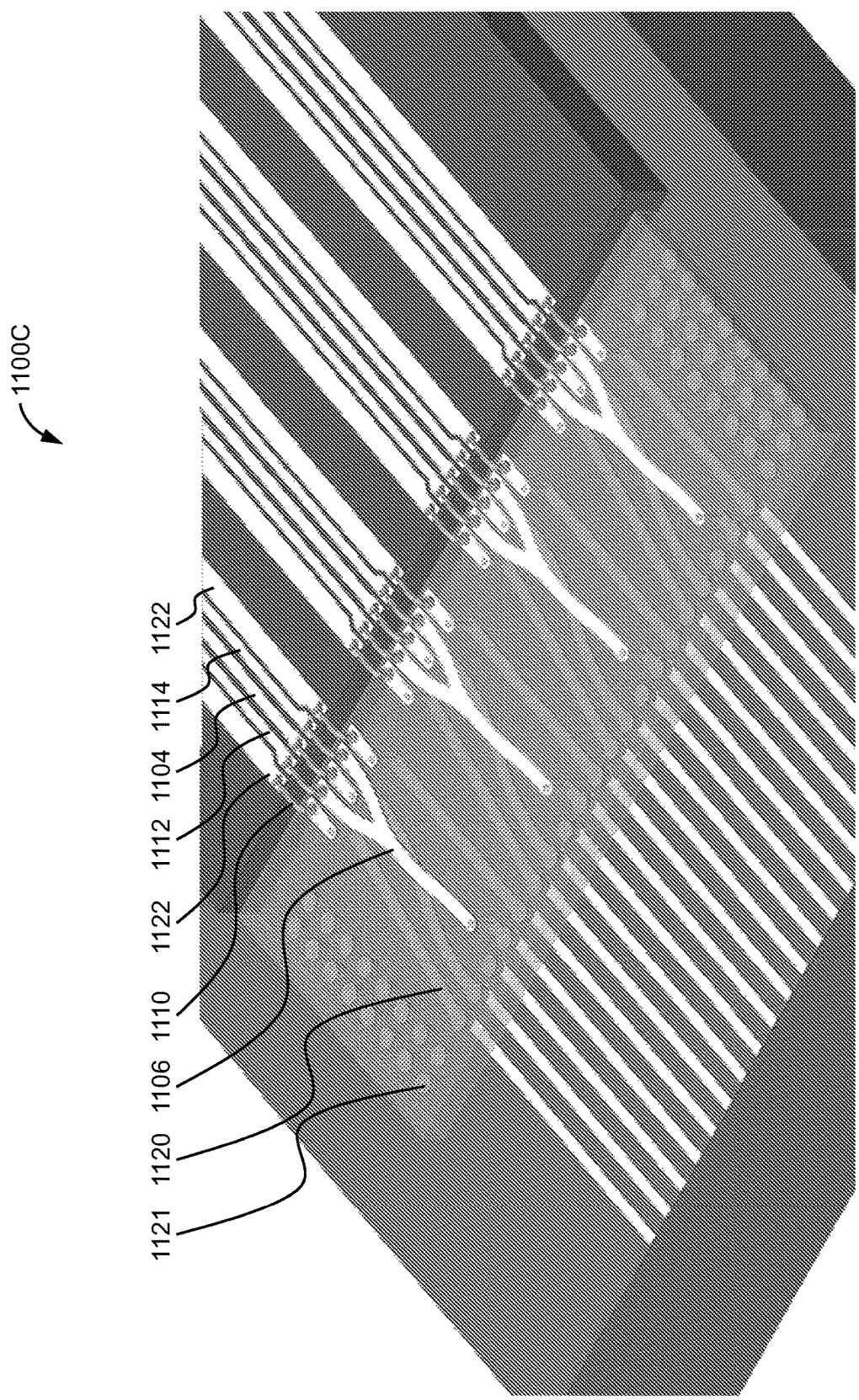
FIG. 11C is a diagram showing a semi-transparent isometric view of an example interconnection structure.

FIGS. 11A, 11B, and 11C show a top view, a side view of a cross-sectional area, and a semi-transparent isometric view, respectively, of an example interconnection structure 1100 that is configured to receive signals from a 2-port differential driver chip 1102 that outputs a first signal on a first output port 1104 (e.g., a signal S) and a second signal on a second output port 1106 (e.g., a signal $\bar{S}$), where the first and second signals are complementary to each other. The two output ports underneath the 2-port differential driver chip 1102 are electrically connected to corresponding input ports of electrodes on an RF carrier 1108 (e.g., by a controlled collapse chip connection) upon which the 2-port differential driver chip 1102 is located. The two electrodes are shaped so that they extend from a surface of the RF carrier 1108 to a top surface of an RF riser 1109 located on the RF carrier 1108. The second signal is split from an input arm 1111 of a splitter electrode on the RF riser 1109 into a third signal on one output arm 1112 of the splitter electrode, and a fourth signal on the other output arm 1114 of the splitter electrode. The first signal is propagated to the portion of the RF riser 1109 after the split portion of the splitter electrode by a cross-over electrode 1115, which crosses under the arm 1112 to provide the first signal on a portion of the cross-over electrode 1115 between the two arms 1112 and 1114. The first signal, the third signal, and the fourth signal are electrically connected to an EO modulator chip 1116, located on top of the RF carrier 1108, by wire-bonds 1110. The EO modulator chip 1116 is arranged to form a Mach-Zehnder modulator that has a waveguide arm 1118A comprising EO material that is driven by an electric field between transmission line electrodes the first signal and the third signal, and a waveguide arm 1118B comprising EO material that is driven by an electric field between transmission line electrodes that carry the first signal and the fourth signal. In some examples, electrodes formed in a second metal layer 1120 (e.g., a redistribution layer) can also be on the bottom of the RF riser 1109, for example by using vias 1121. FIG. 11C shows an example G-$\bar{S}$-G-S-G to G-$\bar{S}$-S-$\bar{S}$-G RF interconnect 1100C using the top and bottom sides of the RF riser 1109, with additional G signals 1122 included for shielding.

FIGS. 12A, 12B, and 12C show circuit diagrams of example splitter circuit configurations corresponding to impedances associated with the splitter electrode. In each example, a signal with an impedance of $Z_0$ is split in such a way that the two resulting output signals each have an impedance of $Z_0$.

Referring to FIG. 12A, a Wilkinson splitter 1200A comprises a first port 1202A with impedance $Z_0$ that is split into two signal paths, each with impedance $\sqrt{2}\,Z_0$. The two signals travel approximately a quarter-wavelength from the splitting point before being connected to one another by an impedance $2Z_0$. The two signal paths are electrically connected to a second port 1204A and a third port 1206A, respectively, each having an impedance of $Z_0$.

Referring to FIG. 12B, a Wye splitter 1200B comprises a first port 1202B with impedance $Z_0$. The first port 1202B is electrically connected to a resistive impedance $Z_0$, after which the signal is split into two signal paths, each with resistive impedance $Z_0$. The two signal paths are then electrically connected to a second port 1204B and a third port 1206B, respectively, each having an impedance of $Z_0$.

Referring to FIG. 12C, a Delta splitter 1200C comprises a first port 1202C with impedance $Z_0$ that is split into two signal paths, each with resistive impedance $Z_0$. The two signal paths are then connected to one another by a resistive impedance $Z_0$. The two signal paths are electrically connected to a second port 1204C and a third port 1206C, respectively, each having an impedance of $Z_0$.

In some examples, the 2-port to 3-port RF interconnection that is enabled by the IIS may be designed to conserve the intended impedance between the 3 final conductors (e.g., $\bar{S}$-S-$\bar{S}$) or 5 final conductors (e.g., G-$\bar{S}$-G-$\bar{S}$-G). For example, if the desired microwave mode for efficient EO modulation is the coplanar even mode, the impedance from the middle conductor (S) to the two side conductors ($\bar{S}$) may be designed to be 100-Ohm each, resulting in a 50-Ohm characteristic impedance on the modulator travelling-wave electrode. For the case of linear EO MZMs with a G-$\bar{S}$-G-$\bar{S}$-G electrode structure, in some examples the external ground electrodes may be used for shielding purposes, since their electrical signals may not be converted to an EO phase shift (e.g., if the optical waveguides are between the S and $\bar{S}$ traces), but it may still be useful to ensure that the electric field distribution associated with the IIS is appropriately matched to the electric field distribution in proximity to these ground electrodes.

In some examples, the 2-port to 3-port RF interconnection may be designed to enhance modal conversions due to the crossing discontinuity. It is possible to have good transmission over a wide band from the differential G-$\bar{S}$-S-G to the useful G-$\bar{S}$-G-$\bar{S}$-G mode for electro-optic modulation using the techniques described herein. Furthermore, the RF interconnection may be designed to reduce timing skew, since it is often desired for differences in signal times to be as close as possible to zero between the three final signal paths (e.g., S and the two $\bar{S}$ signals). To achieve reduced time-skewing, the electrical paths may be matched inside the 2-port to 3-port RF interconnection structure. In some examples, slow-wave structures (e.g., T-rails and/or bends) could be used to delay one line relative to the others. This is similar to the wire-bond 508 that angled forward by an angle α to prevent what would be a relative time delay.

In general, the y-branch, Wye, and Delta splitter designs may allow for broadband design due to their simple (e.g., not substantially wavelength-dependent) and passive design. Herein, unless otherwise stated, the y-branch splitter (implemented, for example, by using a single metal later, wire-bonds, and/or a second metal layer and vias) is shown for simplicity. In general, other splitters (e.g., Wilkinson, Wye, and Delta) may be used. Regarding resistor-based splitters (e.g., Wye and Delta), there can be an intrinsic 3-dB loss in addition to the 3-dB split loss and the splitter excess loss (>6 dB total loss). Herein, the $\bar{S}$-S-$\bar{S}$ or the G-$\bar{S}$-G-$\bar{S}$-G configurations are used to represent the differential electrode layout for a Pockels (i.e., linear EO) modulator, however, in general, other 2-port to 3-port RF interconnections may be applied interchangeably to both configurations, with the schematics adapted to reflect this. As previously mentioned, in either case, the microwave mode for EO modulation is often located between the S and $\bar{S}$ traces only, since this is where the optical waveguides being modulated are often located. The linear EO modulator material may be TFLN, bulk x-cut LN, barium titanate (BTO), EO polymers, or other materials. In addition to a RF carrier/RF riser, some embodiments may also be directly implemented within a 2-port differential driver chip's output (e.g., 902, 1002, and 1102), an EO modulator chip's input (e.g., 916, 1016, and 1116), or directly at their intersection. In general, various assembly processes may be used for the examples presented herein. For example, wire-bonds and in-substrate vias shown herein may be substituted with redistribution layers or flip-chip transitions, among other methods.

FIGS. 13A-13D and 14A-14D show example IIS splitter and cross-over electrodes forming RF interconnects for G-$\bar{S}$-S-G to G-S-$\bar{S}$-S-G transitions comprising three types of electrodes: an S electrodes carrying an S signal, an $\bar{S}$ electrode carrying an $\bar{S}$ signal, and two G electrodes carrying a G signal (i.e., electrodes that are electrically grounded, e.g., by electrical connection to a ground port of the driver). In general, G-$\bar{S}$-S-G to G-$\bar{S}$-G-$\bar{S}$-G transitions may also be implemented using similar layouts (e.g., by swapping S and $\bar{S}$ in the examples shown). The interconnect designs may be used, for example, on RF carriers/RF risers where either wire-bonds/wedge-bonds or two integrated metal layers vertically close to one another (e.g., within a few μm) with connecting vias are available. The design of the RF interconnect may be chosen based on the following factors: insertion and return loss minimization, target impedance, phase matching (i.e., absence of skew) for the target RF mode, operation over a broad range of frequencies (e.g., 10 MHz to 100 GHz). Additional factors may include minimization of crosstalk to neighbor channels, design robustness (e.g., against excitation of unwanted microwave modes), design manufacturability, repeatability and reliability. In general, crossing signal paths may be designed such that the electrodes carrying those signals cross close to 90 degrees in order to reduce crosstalk. In some implementations, the two S signals each have a voltage magnitude approximately equal to the voltage magnitude of the $\overline{S}$ signal and a negative voltage amplitude compared to the $\overline{S}$ signal (i.e., opposite sign). In some implementations there may be one or more G signals that are grounded (i.e., at zero voltage) and may be used for shielding purposes (e.g., reducing the effects of electric or magnetic fields external to the RF interconnect, possibly due to other RF interconnects, from modifying the S or $\overline{S}$ signals). In other examples, the G signals can be omitted. Although a second conducting layer connected by vias is used in the following examples, other connections (e.g., wire-bonding, a redistribution layer) may instead be implemented in some examples.

Figure 13A:
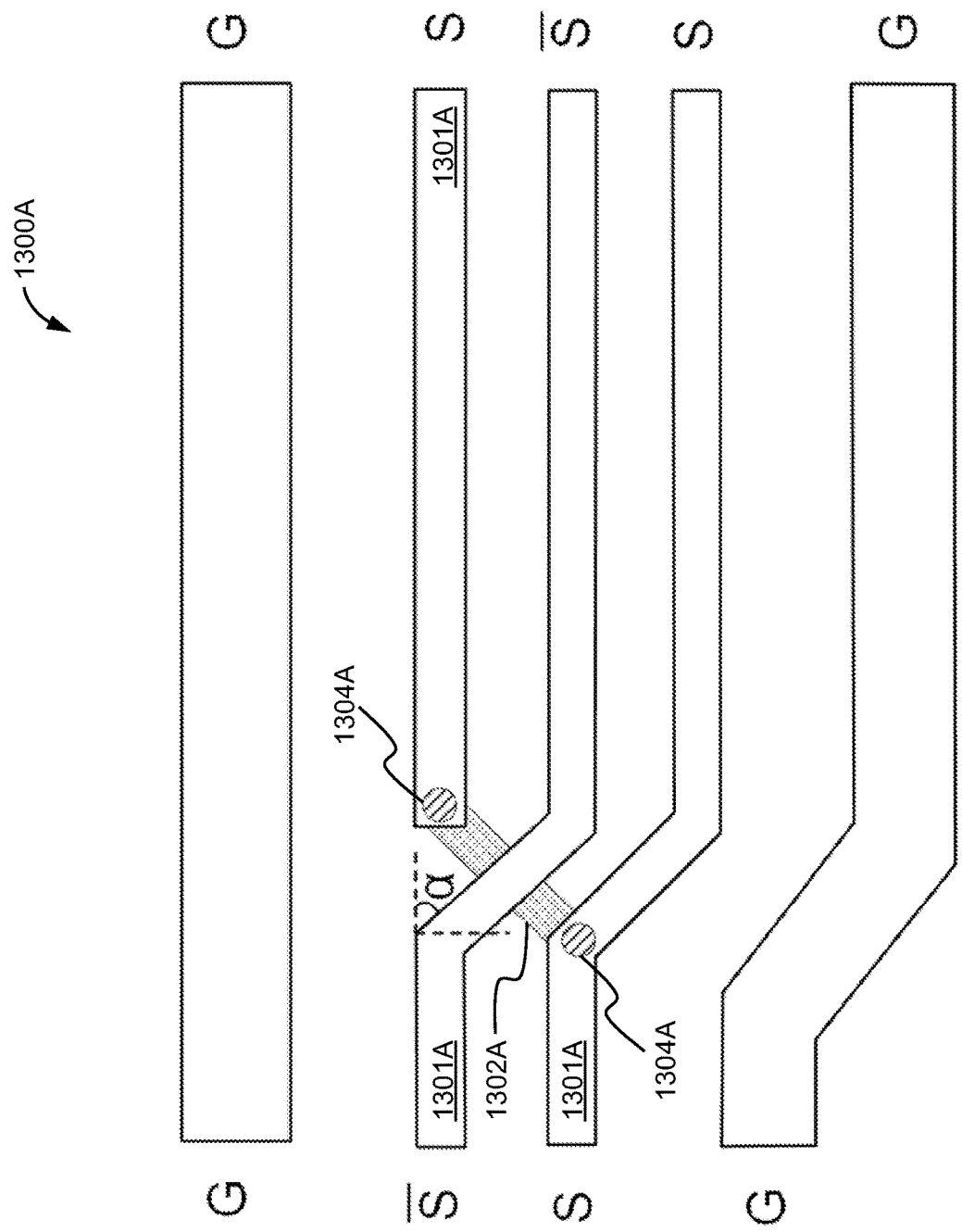
FIGS. 13A-13D are schematic diagrams of example RF interconnects.

FIG. 13A shows an example RF interconnect 1300A wherein an S signal (e.g., transmitted by a metal trace or other conductor that forms the electrode for that signal) located in a first layer 1301A and in a second layer 1302A, connected by vias 1304A, forms a bridge connecting the S signal under an $\overline{S}$ signal that is located in the first layer 1301A. An angle α formed between two lines associated with edges of the conductor conducting the $\overline{S}$ signal may be chosen to optimize one or more design parameters (e.g., to reduce crosstalk between the S signal and the $\overline{S}$ signal). The vias 1304A can be singular vias or one or more groups of vias, with the layout determined by applicable design rules, crosstalk, and reliability considerations.

Figure 13B:
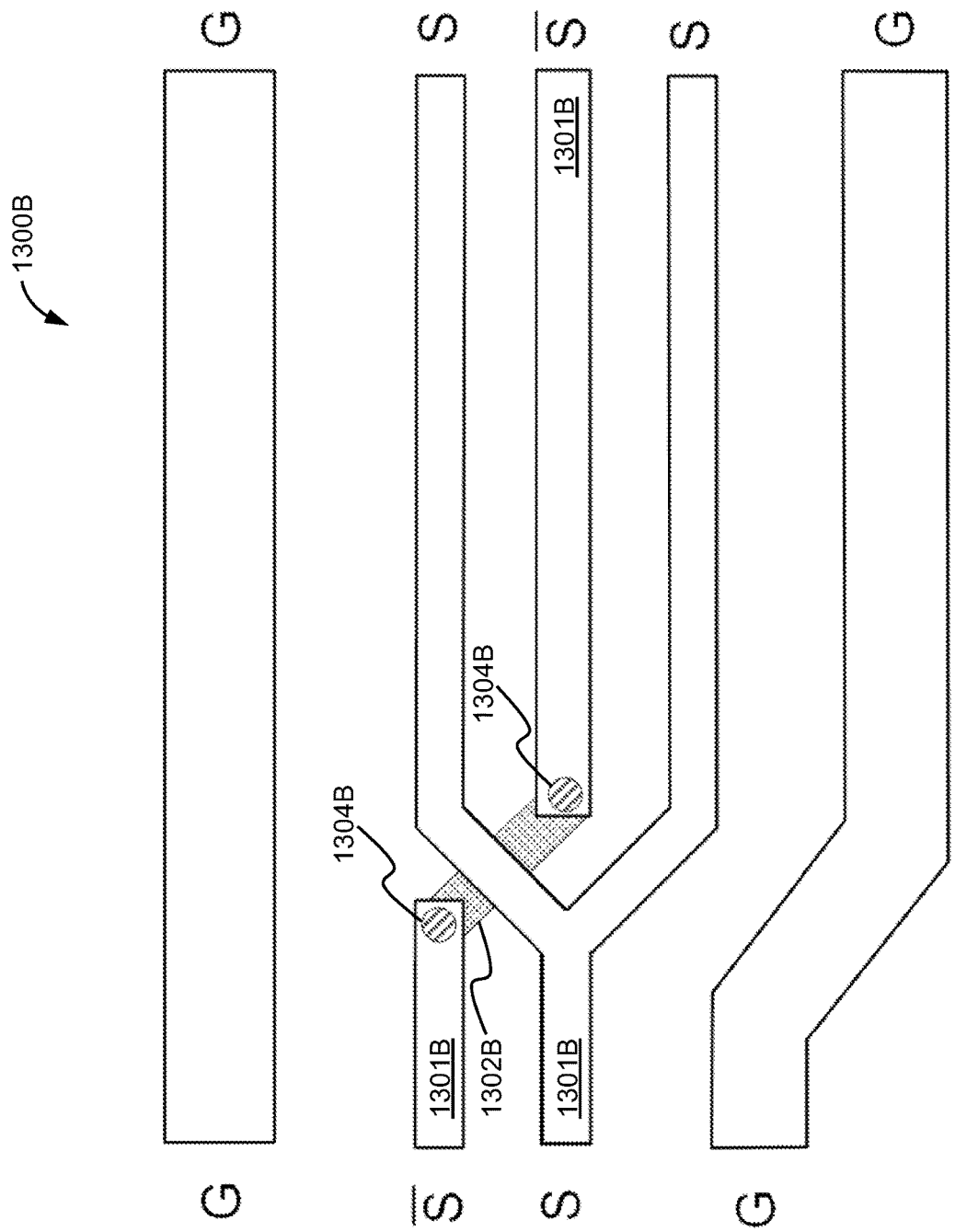

FIG. 13B shows an example RF interconnect 1300B wherein an $\overline{S}$ signal located in a first layer 1301B and in a second layer 1302B, connected by vias 1304B, forms a bridge connecting the $\overline{S}$ signal under an S signal that is located in the first layer 1301B. The S signal is split into two S signals (e.g., by using a y-branch, a Wilkinson splitter, a Wye splitter, or a Delta splitter), such that the bridge traverses under one of the two split S signals.

Figure 13C:
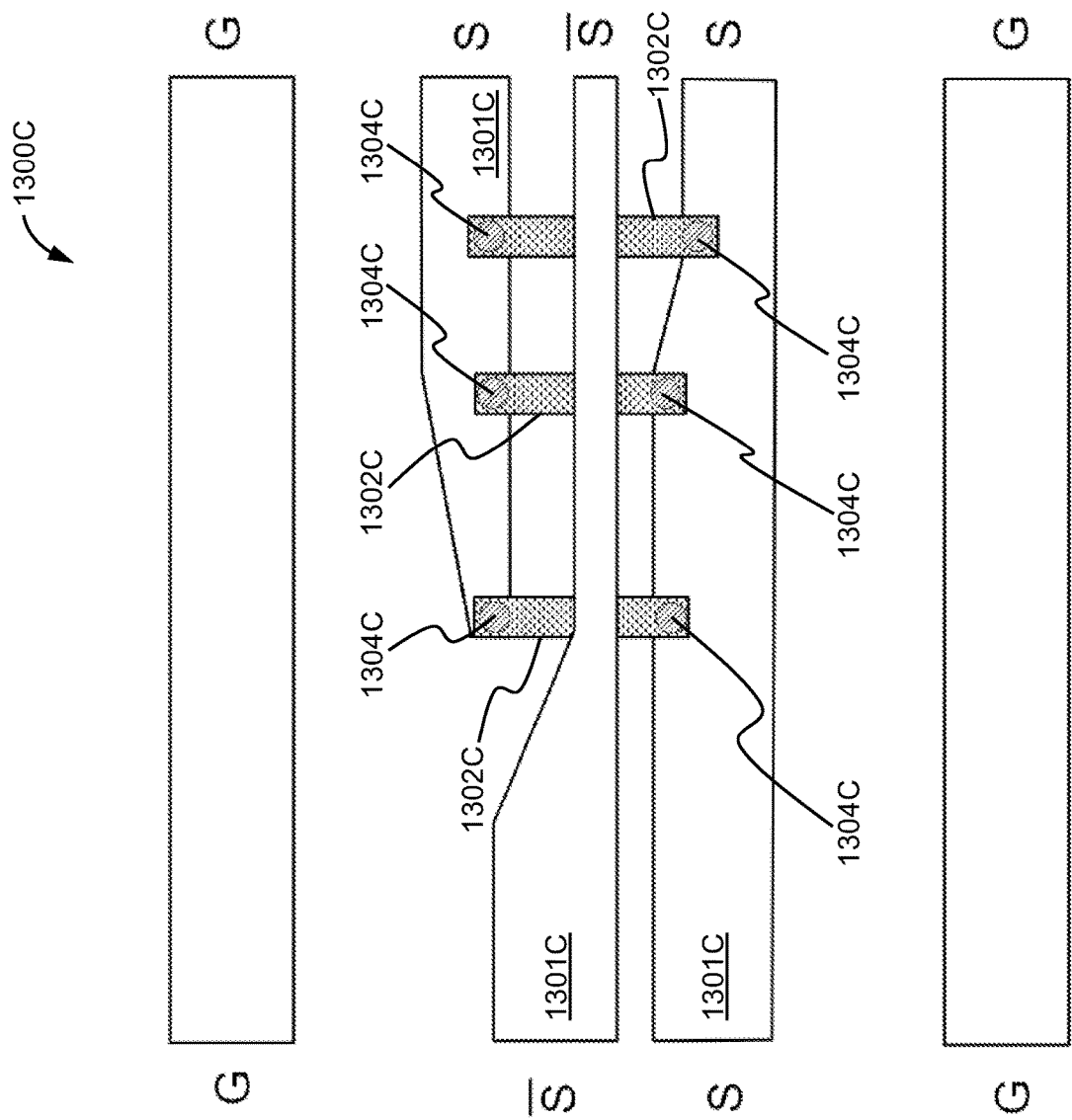

FIG. 13C shows an example RF interconnect 1300C wherein an S signal located in a first layer 1301C and in a second layer 1302C, connected by vias 1304C, forms multiple bridges connecting the S signal under an $\overline{S}$ signal that is located in the first layer 1301C.

Figure 13D:
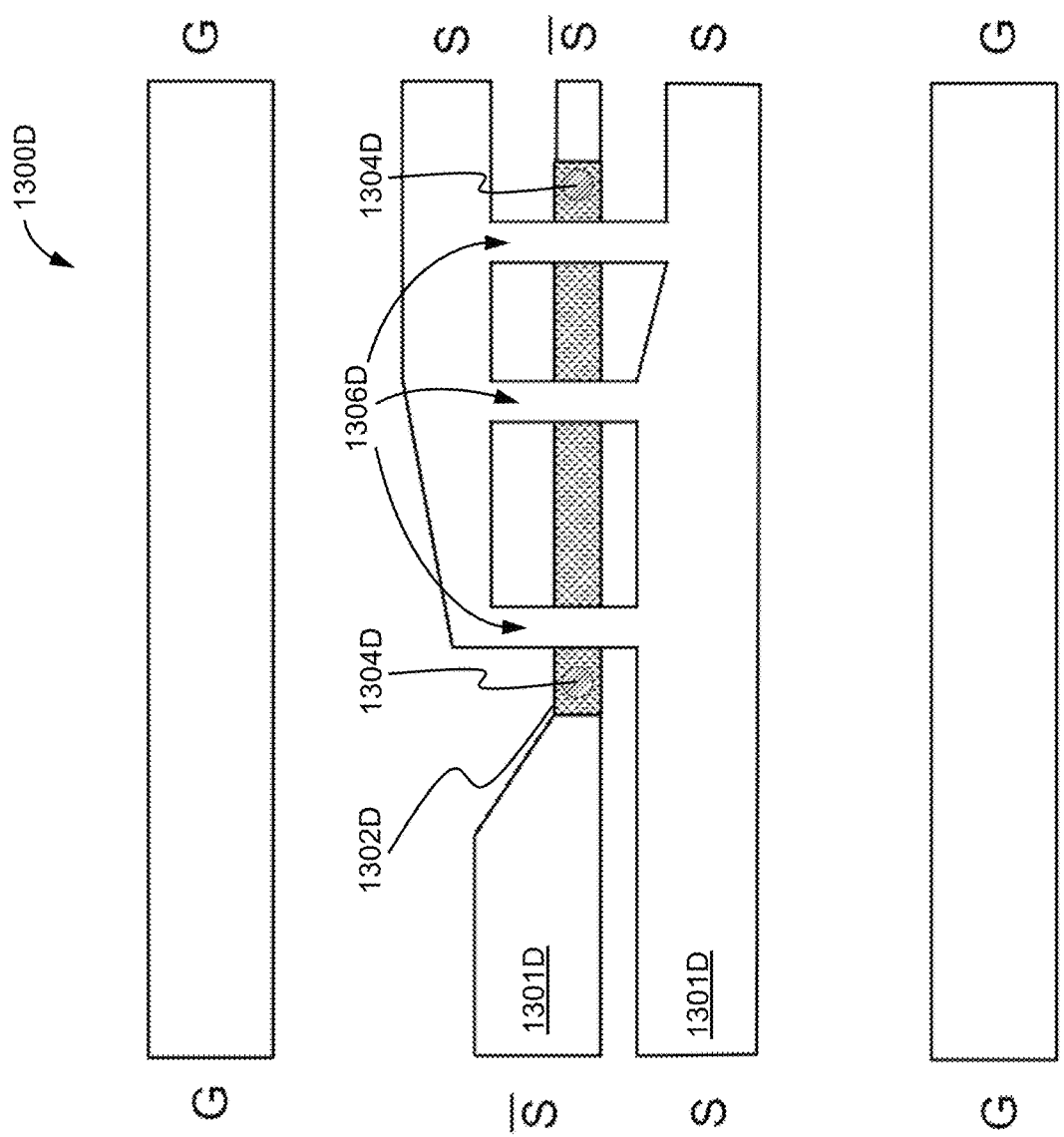

FIG. 13D shows an example RF interconnect 1300D wherein an $\overline{S}$ signal located in a first layer 1301D and in a second layer 1302D, connected by vias 1304D, forms a bridge connecting the $\overline{S}$ signal under multiple S signal bridges 1306D that are located in the first layer 1301D.

Figure 14A:
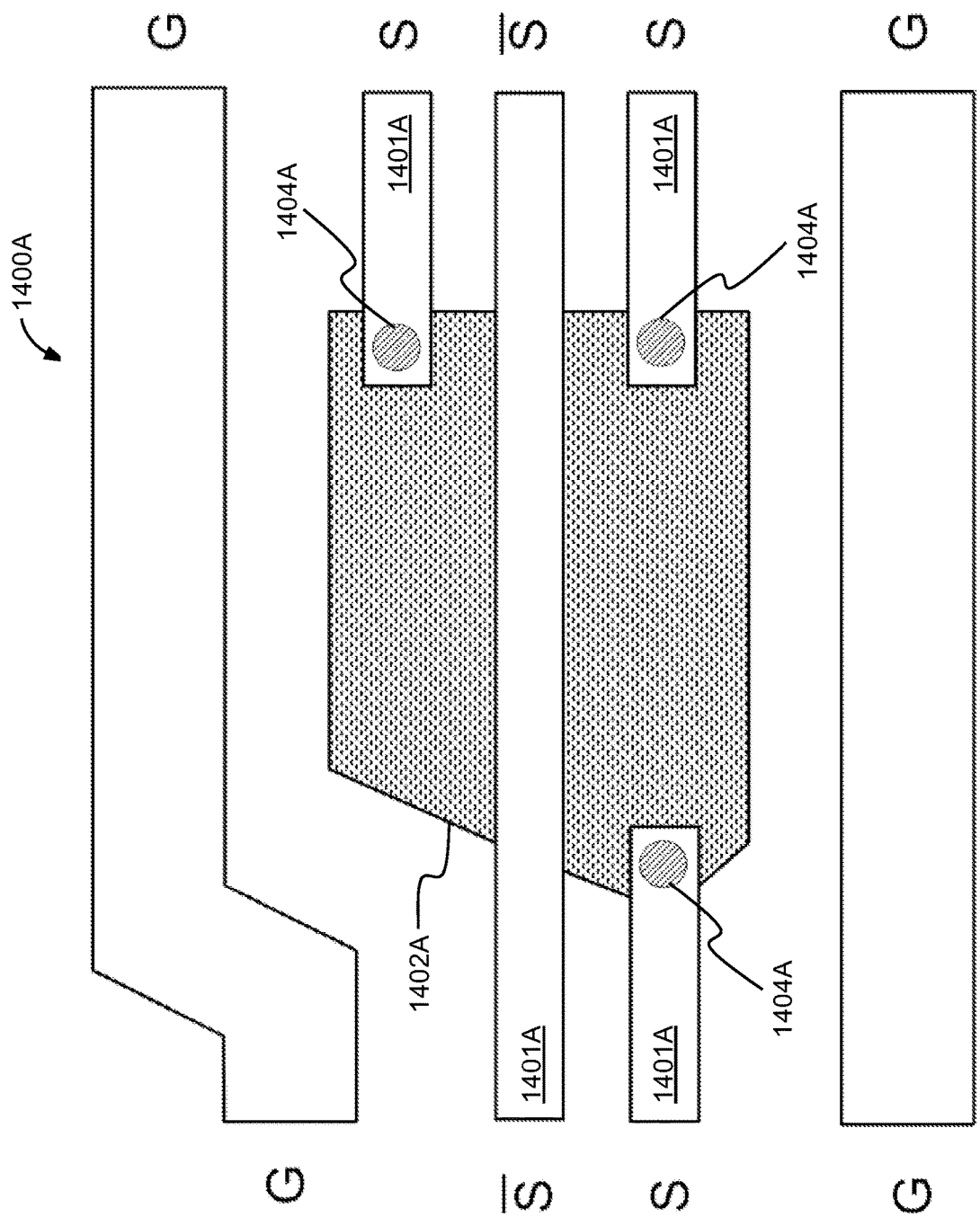
FIGS. 14A-14D are schematic diagrams of example RF interconnects.

FIG. 14A shows an example RF interconnect 1400A wherein an S signal located in a first layer 1401A and in a second layer 1402A, connected by vias 1404A, forms a bridge under an $\overline{S}$ signal that is located in the first layer 1401A. The S signal in the second layer 1402A is connected by vias 1404A to two output S signals that are located in the first layer 1401A, thus splitting the S signal into two S signals. The width of the portion of the S signal in the second layer 1402A can be substantially different from the width of the portion of the S signal in the first layer 1401A and from the width of the portion of the $\overline{S}$ signal in the first layer 1401A directly above the portion of the S signal in the second layer 1402A. Furthermore, the S signal may have a non-rectangular shape.

Figure 14B:
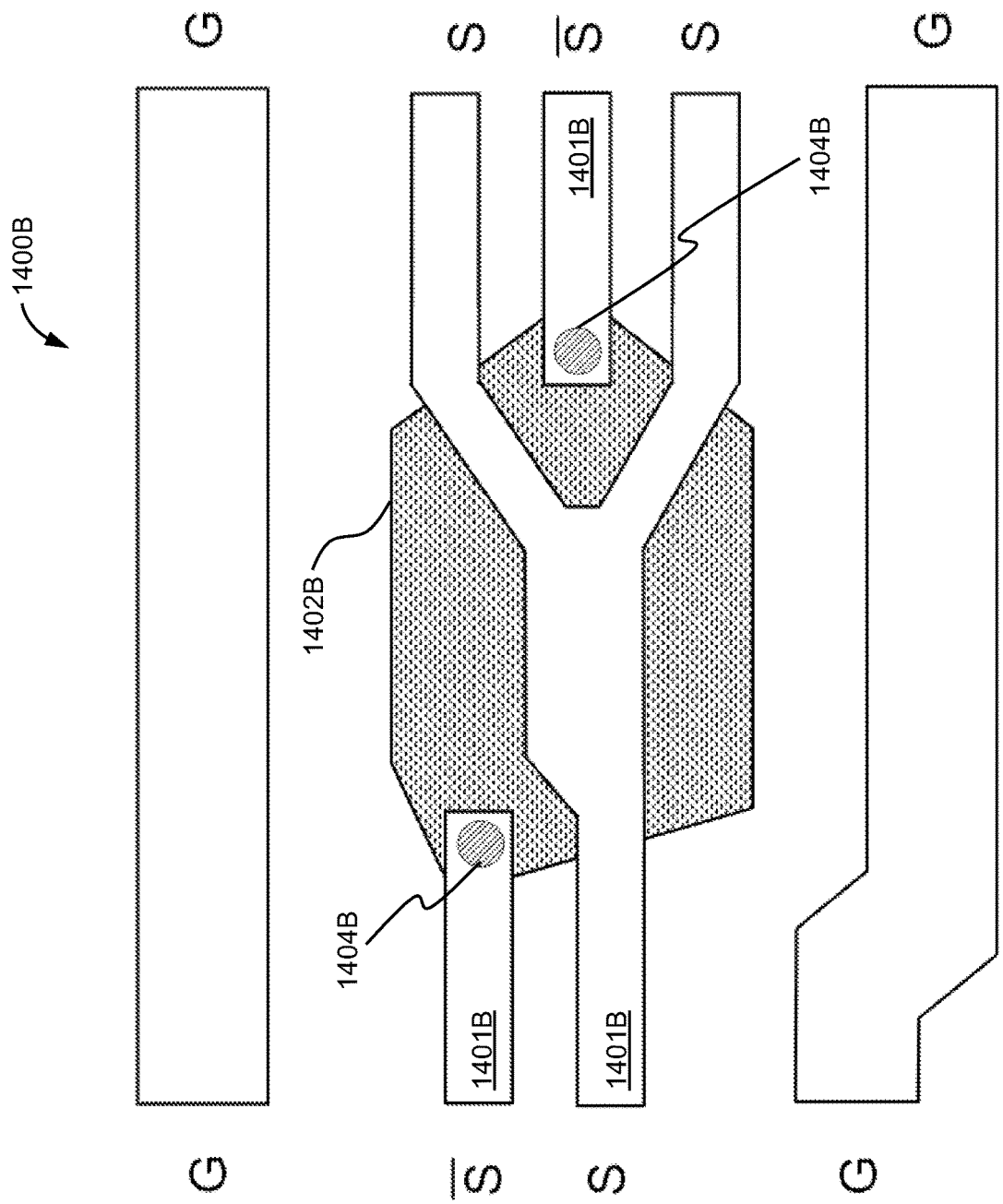

FIG. 14B shows an example RF interconnect 1400B wherein an $\overline{S}$ signal located in a first layer 1401B and in a second layer 1402B, connected by vias 1404B, forms a bridge under an S signal that is located in the first layer 1401B. The S signal is split into two S signals (e.g., by using a y-branch, a Wilkinson splitter, a Wye splitter, or a Delta splitter). The width of the portion of the $\overline{S}$ signal in the second layer 1402B can be substantially different from the width of the portion of the $\overline{S}$ signal in the first layer 1401B and from the width of the portion of the S signal in the first layer 1401B directly above the portion of the $\overline{S}$ signal in the second layer 1402B. Furthermore, the $\overline{S}$ signal may have a non-rectangular shape.

Figure 14C:
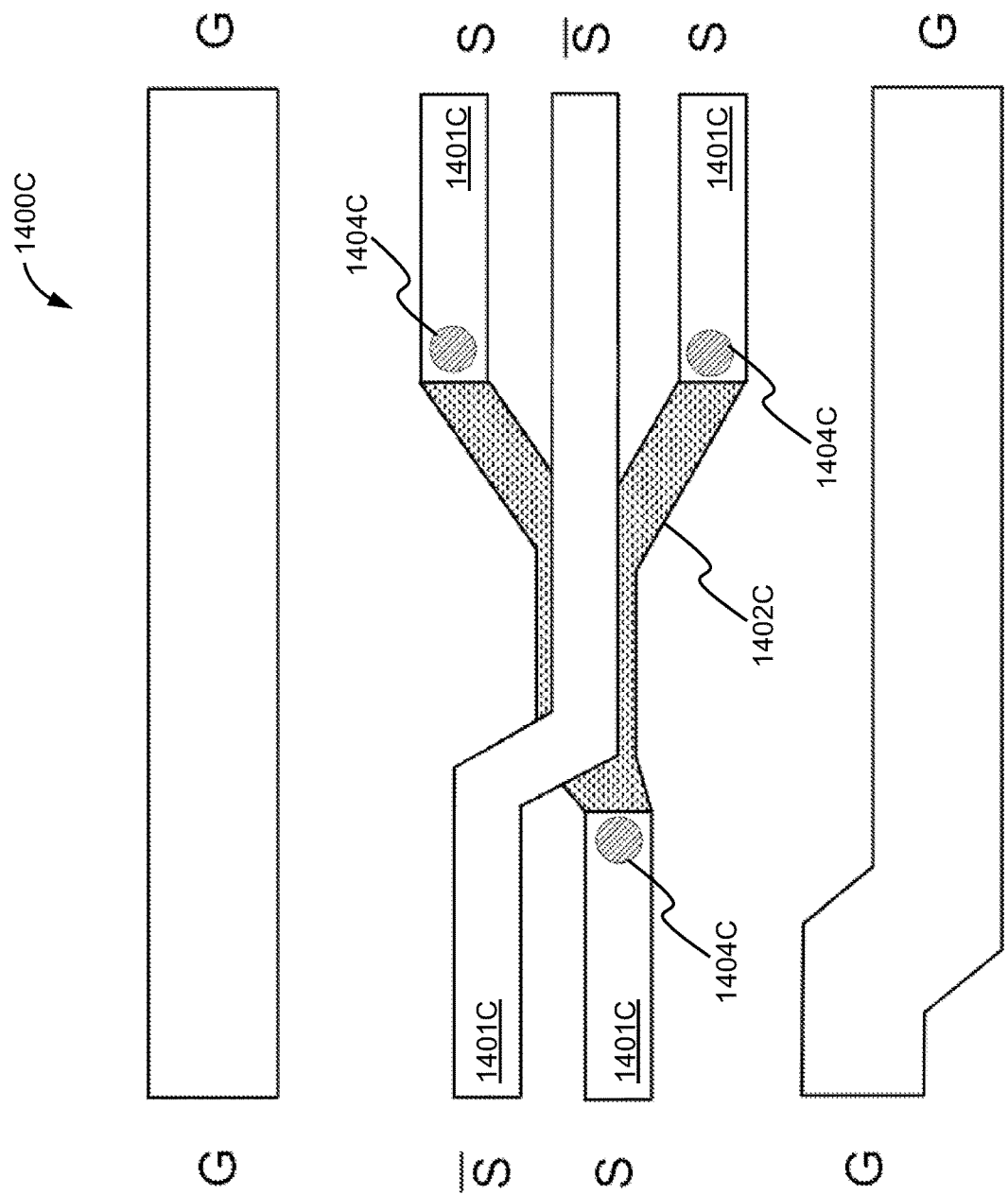

FIG. 14C shows an example RF interconnect 1400C wherein an S signal located in a first layer 1401C and in a second layer 1402C, connected by vias 1404C, forms a bridge under an $\overline{S}$ signal that is located in the first layer 1401C. The S signal is split, in the second layer 1402C, into two S signals (e.g., by using a y-branch, a Wilkinson splitter, a Wye splitter, or a Delta splitter). The width of the S signal may vary (e.g., widening in proximity to the splitting junction). Furthermore, the width of the portion of the S signal in the second layer 1402C can be substantially similar to the width of the portion of the $\overline{S}$ signal in the first layer 1401C directly above the portion of the S signal in the second layer 1402C.

Figure 14D:
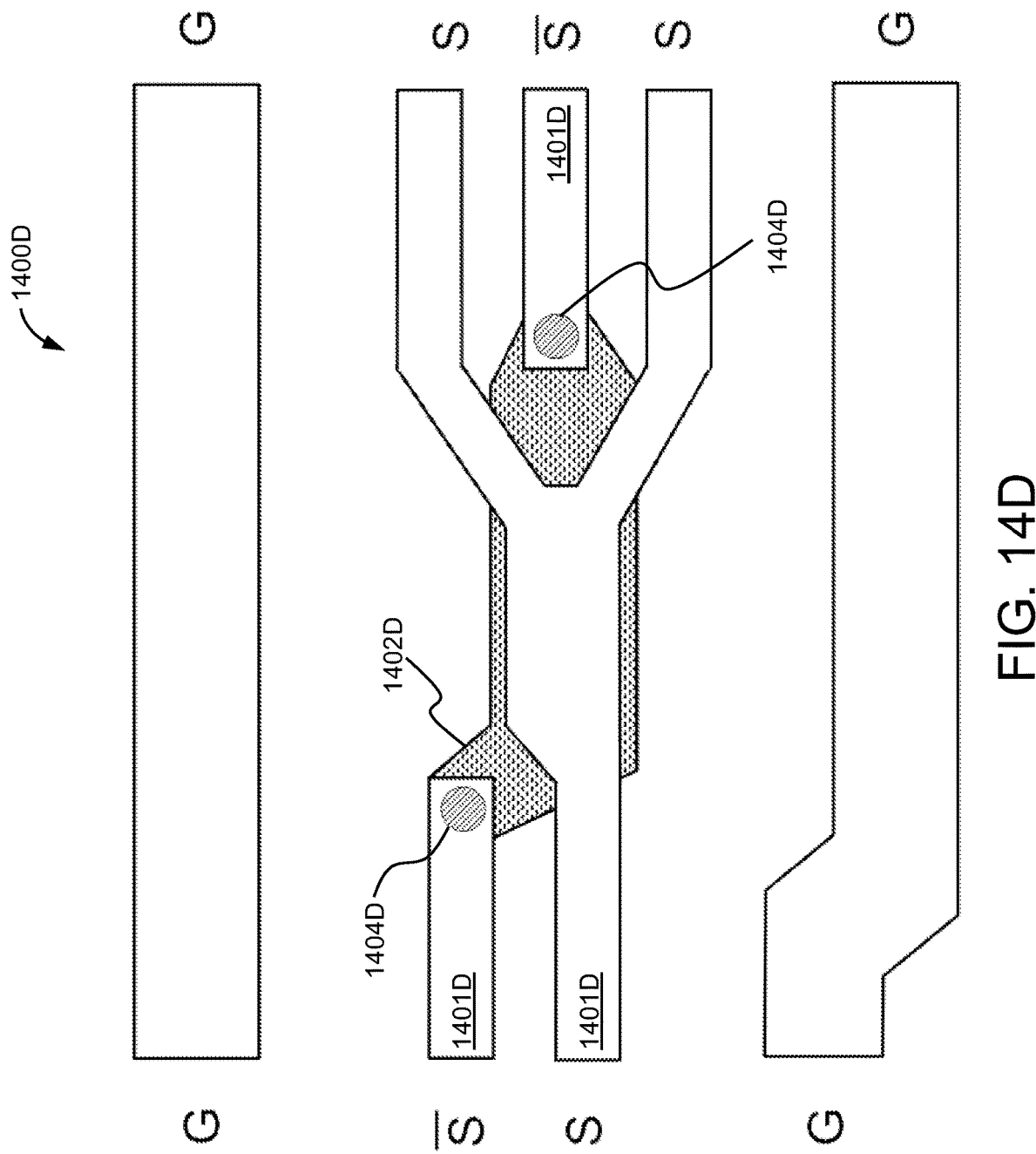

FIG. 14D shows an example RF interconnect 1400D wherein an $\overline{S}$ signal located in a first layer 1401D and in a second layer 1402D, connected by vias 1404D, forms a bridge under an S signal that is located in the first layer 1401D. The S signal is split, in the first layer 1401D, into two S signals (e.g., by using a y-branch, a Wilkinson splitter, a Wye splitter, or a Delta splitter). The width of the S signal may vary (e.g., widening in proximity to the splitting junction). Furthermore, the width of the portion of the $\overline{S}$ signal in the second layer 1402D can be substantially similar to the width of the portion of the S signal in the first layer 1401D directly above the portion of the $\overline{S}$ signal in the second layer 1402D.

Figure 15:
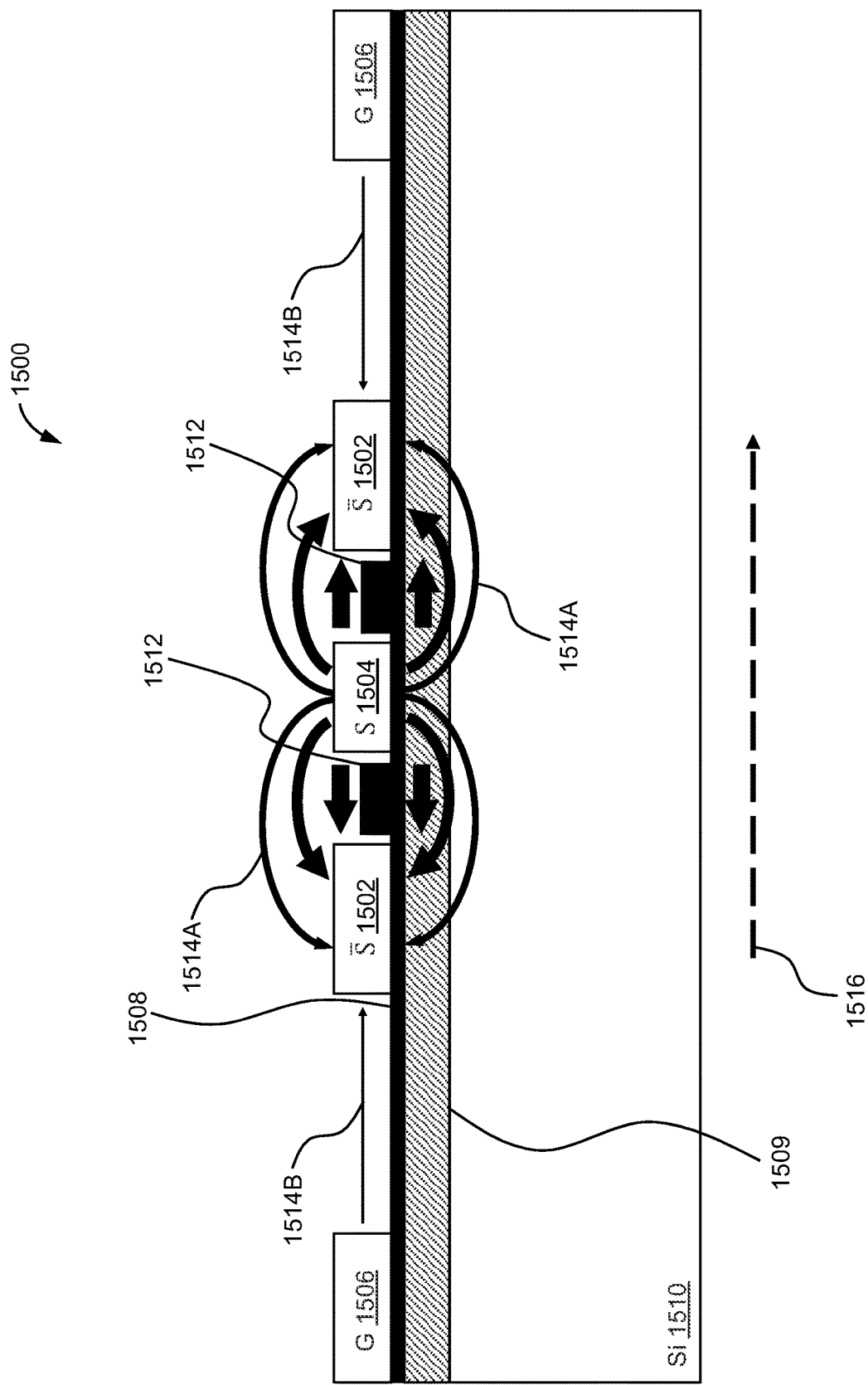
FIG. 15 is a schematic diagram showing a cross-sectional side view of an example electro-optic modulator.

FIG. 15 shows a cross-sectional side view of an example EO modulator chip 1500 showing an example electric field distribution corresponding to an impedance matching configuration of the IIS. Two $\overline{S}$ electrodes 1502, an S electrode 1504, and two G electrodes 1506 are located on top of an EO layer 1508 that is located on top of an $SiO_2$ layer 1509, which is itself located on top of an Si layer 1510. The EO layer 1508 forms two waveguides 1512 with optical properties (e.g., refractive index and/or absorption) that depend on inner electric fields 1514A located between the S electrode 1504 and each of the two $\overline{S}$ electrodes 1502, as well as outer electric fields 1514B located between each of the two G electrodes 1506 and each of the two $\overline{S}$ electrodes 1502. The EO layer 1508 has a ferro-electric domain orientation along an axis 1516 across the EO modulator chip 1500, such that the EO layer 1508 has a nonzero polarization even in the absence of an applied electric field. In some examples, the inner electric fields 1514A can be significantly larger than the outer electric fields 1514B. The electric field lines of the inner electric fields 1514A and the outer electric fields 1514B possess thicknesses that serve to illustrate the corresponding magnitude of the electric fields, with thicker lines indicating larger electric fields. Along the length of the electrodes, smooth changes (e.g., slowly varying) to the electromagnetic field profile may be designed in order to limit the excitation of unwanted modes (i.e., modes that the EO modulator chip 1500 does not utilize) and to provide desired impedance matching (e.g., a similar impedance for the two $\overline{S}$ electrodes 1502 and the S electrode 1504). The arrangement of the pair of outer ground electrodes, such that all of the other signal carrying electrodes of the IIS are between the two ground electrodes of the IIS, is also useful for ensuring the appropriate distribution of electromagnetic fields to limit the excitation of unwanted modes and provide the desired impedance matching.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus comprising:
   an electro-optic material;
   an optical waveguide structure forming a Mach-Zehnder interferometer in proximity to the electro-optic material, where the Mach-Zehnder interferometer includes a first optical waveguide arm and a second optical waveguide arm;
   a first electrical input port configured to receive a first drive signal;
   a second electrical input port configured to receive a second drive signal that has a negative amplitude relative to the first drive signal;
   a first transmission line configured to propagate a first electromagnetic wave over at least a portion of the first optical waveguide arm to apply an optical phase modulation to an optical wave propagating in the first optical waveguide arm according to an electro-optic modulation of a portion of the electro-optic material;
   a second transmission line configured to propagate a second electromagnetic wave over at least a portion of the second optical waveguide arm to apply an optical phase modulation to an optical wave propagating in the second optical waveguide arm according to an electro-optic modulation of a portion of the electro-optic material; and
   a drive signal interconnection structure configured to provide a first electrical connection between the first electrical input port and an inner electrode shared by the first and second transmission lines, and a second electrical connection between the second electrical input port and respective outer electrodes of the first and second transmission lines, where the drive signal interconnection structure is configured to preserve relative phase shifts between the first and second drive signals;
   where a first impedance associated with a first electric field distribution between the inner electrode and a first of the outer electrodes and a second impedance associated with a second electric field distribution between the inner electrode and a second of the outer electrodes are substantially equal to each other to provide impedance matching;
   where the inner electrode and outer electrodes are disposed between a first ground electrode and a second ground electrode, with the first ground electrode and the second ground electrode being electrically grounded and associated with a third electric field distribution between a first of the outer electrodes and the first ground electrode and a fourth electric field distribution between a second of the outer electrodes and the second ground electrode, and
   where the third electric field distribution and the fourth electric field distribution contribute to providing the impedance matching.

2. The apparatus of claim 1, where the drive signal interconnection structure is configured to transform electrical impedances associated with a changing electric field distribution of a guided mode propagating over the first electrical connection and changing electric field distribution of a guided mode propagating over the second electrical connection such that the first impedance and the second impedance are substantially equal to each other.

3. The apparatus of claim 1, where the drive signal interconnection structure comprises a first electrode between the first electrical input port and the electrode shared by the first and second transmission lines, a second electrode comprising an input arm coupled to the second electrical input port and a first output arm coupled to an electrode of the first transmission line, and a second output arm coupled to an electrode of the second transmission line.

4. The apparatus of claim 3, where the first electrode is configured to be positioned between the first output arm and the second output arm at a portion of the drive signal interconnection structure at which the first impedance and the second impedance are substantially equal to each other, without contacting any portion of the second electrode.

5. The apparatus of claim 4, where the first electrode is configured to cross above or below a portion of the second electrode at an angle that is substantially 90 degrees.

6. The apparatus of claim 1, where the optical waveguide structure is formed from a portion of the electro-optic material.

7. The apparatus of claim 1, where the first electric field distribution and the second electric field distribution are associated with a guided mode of an electromagnetic wave propagating over the first electrical connection and the second electrical connection, and the electromagnetic wave has a spectrum having a peak intensity between about 10 MHz and 100 GHz.

8. The apparatus of claim 1, where the electro-optic material, the optical waveguide structure, and the first and second transmission lines are on a first chip, and the drive signal interconnection structure is between the first chip and a second chip, where the second chip comprises a driver circuit configured to provide the first drive signal and second drive signal; and where the drive signal interconnection structure comprises a riser structure mounted on a surface of a carrier, and the first and second chips are each mounted to the surface of the carrier.

9. The apparatus of claim 8, where a first portion of the first electrical connection of the drive signal interconnection structure is positioned on a first surface of the riser structure and a portion of the second electrical connection of the drive signal interconnection structure is positioned on a second surface of the riser structure.

10. The apparatus of claim 9, where a second portion of the first electrical connection of the drive signal interconnection structure is positioned on the second surface of the riser structure.

11. The apparatus of claim 9, where the first portion of the first electrical connection of the drive signal interconnection structure is connected to the portion of the second electrical connection of the drive signal interconnection structure by a vertical metal contact between the first surface of the riser structure and the second surface of the riser structure.

12. A method comprising:
providing an electro-optic material;
forming an optical waveguide structure forming a Mach-Zehnder interferometer in proximity to the electro-optic material, where the Mach-Zehnder interferometer includes a first optical waveguide arm and a second optical waveguide arm;
forming a first electrical input port configured to receive a first drive signal;
forming a second electrical input port configured to receive a second drive signal that has a negative amplitude relative to the first drive signal;
forming a first transmission line configured to propagate a first electromagnetic wave over at least a portion of the first optical waveguide arm to apply an optical phase modulation to an optical wave propagating in the first optical waveguide arm according to an electro-optic modulation of a portion of the electro-optic material;
forming a second transmission line configured to propagate a second electromagnetic wave over at least a portion of the second optical waveguide arm to apply an optical phase modulation to an optical wave propagating in the second optical waveguide arm according to an electro-optic modulation of a portion of the electro-optic material; and
forming a drive signal interconnection structure configured to provide a first electrical connection between the first electrical input port and an inner electrode shared by the first and second transmission lines, and a second electrical connection between the second electrical input port and respective outer electrodes of the first and second transmission lines, where the drive signal interconnection structure is configured to preserve relative phase shifts between the first and second drive signals;
where a first impedance associated with a first electric field distribution between the inner electrode and a first of the outer electrodes and a second impedance associated with a second electric field distribution between the inner electrode and a second of the outer electrodes are substantially equal to each other to provide impedance matching;
where the inner electrode and outer electrodes are disposed between a first ground electrode and a second ground electrode, with the first ground electrode and the second ground electrode being electrically grounded and associated with a third electric field distribution between a first of the outer electrodes and the first ground electrode and a fourth electric field distribution between a second of the outer electrodes and the second ground electrode, and
where the third electric field distribution and the fourth electric field distribution contribute to providing the impedance matching.

13. The method of claim 12, where the drive signal interconnection structure is configured to transform electrical impedances associated with a changing electric field distribution of a guided mode propagating over the first electrical connection and changing electric field distribution of a guided mode propagating over the second electrical connection such that the first impedance and the second impedance are substantially equal to each other.

14. The method of claim 12, where the drive signal interconnection structure comprises a first electrode between the first electrical input port and the electrode shared by the first and second transmission lines, a second electrode comprising an input arm coupled to the second electrical input port and a first output arm coupled to an electrode of the first transmission line, and a second output arm coupled to an electrode of the second transmission line.

15. The method of claim 14, where the first electrode is configured to be positioned between the first output arm and the second output arm at a portion of the drive signal interconnection structure at which the first impedance and the second impedance are substantially equal to each other, without contacting any portion of the second electrode.

16. The method of claim 15, where the first electrode is configured to cross above or below a portion of the second electrode at an angle that is substantially 90 degrees.

17. The method of claim 12, where the optical waveguide structure is formed from a portion of the electro-optic material.

18. The method of claim 12, where the electro-optic material, the optical waveguide structure, and the first and second transmission lines are on a first chip, and the drive signal interconnection structure is between the first chip and a second chip, where the second chip comprises a driver circuit configured to provide the first drive signal and second drive signal; and where the drive signal interconnection structure comprises a riser structure mounted on a surface of a carrier, and the first and second chips are each mounted to the surface of the carrier.

19. The method of claim 18, where a first portion of the first electrical connection of the drive signal interconnection structure is positioned on a first surface of the riser structure and a portion of the second electrical connection of the drive signal interconnection structure is positioned on a second surface of the riser structure.

* * * * *